(12) United States Patent
Zhang

(10) Patent No.: US 11,616,706 B2
(45) Date of Patent: Mar. 28, 2023

(54) PACKET PROCESSING METHOD AND DEVICE DESIGNED FOR BLOCKCHAIN TASKS

(71) Applicant: HUAWEI TECHNOLOGIES CO., LTD., Shenzhen (CN)

(72) Inventor: Yabo Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/336,439

(22) Filed: Jun. 2, 2021

(65) Prior Publication Data

US 2021/0385140 A1 Dec. 9, 2021

(30) Foreign Application Priority Data

Jun. 3, 2020 (CN) .......................... 202010496892.4

(51) Int. Cl.
*H04L 43/0817* (2022.01)
*H04L 12/18* (2006.01)
*H04L 69/22* (2022.01)

(52) U.S. Cl.
CPC ...... *H04L 43/0817* (2013.01); *H04L 12/1886* (2013.01); *H04L 69/22* (2013.01)

(58) Field of Classification Search
CPC .. H04L 12/1886; H04L 43/0817; H04L 69/22
USPC ...................................................... 709/224
See application file for complete search history.

(56) References Cited

U.S. PATENT DOCUMENTS

| 7,600,255 | B1 * | 10/2009 | Baugher | ............. | H04L 63/1458 |
|---|---|---|---|---|---|
| | | | | | 713/168 |
| 2003/0067925 | A1 * | 4/2003 | Choe | ...................... | H04L 45/42 |
| | | | | | 370/432 |
| 2011/0110370 | A1 * | 5/2011 | Moreno | .................. | H04L 45/04 |
| | | | | | 370/392 |
| 2013/0089005 | A1 * | 4/2013 | Li | ......................... | H04L 45/025 |
| | | | | | 370/255 |
| 2017/0236120 | A1 * | 8/2017 | Herlihy | ............... | G06Q 20/065 |
| | | | | | 705/67 |
| 2017/0324738 | A1 * | 11/2017 | Hari | ........................ | H04L 63/08 |

(Continued)

FOREIGN PATENT DOCUMENTS

| CN | 109165092 | A | 1/2019 |
|---|---|---|---|
| CN | 109698792 | A | 4/2019 |
| CN | 111082922 | A | 4/2020 |
| WO | 2020099924 | A1 | 5/2020 |

OTHER PUBLICATIONS

Nakamoto, Bitcoin: A Peer-to-Peer Electronic Cash System, pp. 1-9 (2008) (Year: 2008).*

(Continued)

*Primary Examiner* — David P Zarka
(74) *Attorney, Agent, or Firm* — Rimon PC

(57) ABSTRACT

This application provides a method for constructing a blockchain network based on an interior gateway protocol (IGP). A new IGP packet used to transmit a blockchain task is provided by extending the IGP. When receiving the new IGP packet, a network device can participate in execution of the blockchain task by using its idle computing power. The computing power of the network device is better utilized to construct the blockchain network, avoiding a waste of idle computing power of the network device.

10 Claims, 13 Drawing Sheets

(56) References Cited

U.S. PATENT DOCUMENTS

| | | | | |
|---|---|---|---|---|
| 2019/0034465 | A1* | 1/2019 | Shimamura | G06F 16/2474 |
| 2019/0058709 | A1* | 2/2019 | Kempf | H04L 9/3239 |
| 2019/0163672 | A1* | 5/2019 | Shmueli | G06F 16/1824 |
| 2019/0289068 | A1* | 9/2019 | Ma | H04L 67/108 |
| 2020/0186458 | A1* | 6/2020 | Farag | G06F 16/1824 |
| 2020/0236031 | A1* | 7/2020 | Singla | H04L 9/3239 |
| 2020/0236032 | A1* | 7/2020 | Singla | H04L 63/10 |

OTHER PUBLICATIONS

Saad et al., RouteChain: Towards Blockchain-based Secure and Efficient BGP Routing, 2019 IEEE International Conference on Blockchain and Cryptocurrency (ICBC), pp. 210-218 (May 2019) (Year: 2019).*

Lastovetska, Blockchain Architecture Basics: Components, Structure, Benefits & Creation, WayBack Machine, pp. 1-21, (Jan. 31, 2019), available at https://web.archive.org/web/20200430183143/https://mlsdev.com/blog/156-how-to-build-your-own-blockchain-architecture (Year: 2019).*

Vujičić et al., Blockchain Technology, Bitcoin, and Ethereum: A Brief Overview, 17th International Symposium Infoteh—Jahorina, pp. 1-6 (Mar. 2018) (Year: 2018).*

Microsoft Computer Dictionary 210, 385 (5th ed. 2002) (Year: 2002).*

Satoshi Nakamoto: Bitcoin: A Peer-to-Peer Electronic Cash System, Oct. 31, 2008, 10 pages.

* cited by examiner

PACKET PROCESSING METHOD AND DEVICE DESIGNED FOR BLOCKCHAIN TASKS

CROSS-REFERENCE TO RELATED APPLICATIONS

This application claims priority to Chinese Patent Application No. 202010496892.4, filed on Jun. 3, 2020, which is hereby incorporated by reference in its entirety.

TECHNICAL FIELD

This application relates to the field of network technologies, and in particular, to a packet processing method, a device, a system, and a storage medium.

BACKGROUND

In network technologies, network devices such as routers and switches are important hardware infrastructures. A network device usually includes one or more main control boards and one or more interface boards. The main control board and the interface board each have one or more central processing units (CPU) or other processors. The network device forwards packets using computing power provided by the processor.

According to big data statistics, currently average CPU usage of network devices is lower than 20%. Therefore, network devices often have idle computing resources, and computing resource usage of the network devices is low.

SUMMARY

Embodiments of this application provide a packet processing method, a device, a system, and a storage medium, to improve usage of a computing resource of a network device. The technical solutions are as follows.

According to a first aspect, a packet processing method is provided. In the method, a first network device receives a first interior gateway protocol (IGP) packet, where the first IGP packet includes a first field, the first field is used to indicate to execute a blockchain task, the blockchain task is a computing task corresponding to a consensus mechanism in a blockchain network, and the blockchain network includes the first network device. The first network device obtains, based on the first IGP packet, input data to the consensus mechanism. The first network device executes, based on the input data, the blockchain task.

A method for constructing a blockchain network based on the IGP is provided. A new IGP packet for propagating a blockchain task is provided by extending the IGP. When receiving the new IGP packet, a network device can participate in execution of the blockchain task by using computing power of the network device. The computing power of the network device is maximized to construct the blockchain network, to avoid a waste of idle computing power of the network device. This improves usage of computing resources of the network device. In addition, this addresses a problem that a blockchain technology is restricted due to insufficient computing power, and facilitates development of the blockchain technology.

Optionally, the first IGP packet includes a link state advertisement (LSA) header, the LSA header includes a link state (LS) type field, and the first field includes the LS type field.

In this optional manner, because an extended new LS type is obtained to identify the blockchain task, and an LSA packet is used to propagate the blockchain task, the network device can use a flooding diffusion mechanism of LSA to perform a function of transmitting the blockchain task in the network. This reduces complexity of implementing the solution.

Optionally, the first IGP packet includes a link state packet protocol data unit (LSP PDU) type field, and the first field includes the LSP PDU type field.

In this optional manner, because an extended new LSP PDU type is obtained to identify the blockchain task, and an LSP packet is used to transmit the blockchain task, the network device can use a flooding and diffusion mechanism of the LSP packet to perform a function of transmitting the blockchain task in the network. This reduces complexity of implementing the solution.

Optionally, the method further includes: deciding, based on that CPU usage of the first network device is less than a threshold, to execute the blockchain task.

In this manner, when the network device is idle, the idle computing power of the network device can be used to start a blockchain task in time. This improves the usage of the computing resources of the network device.

Optionally, after the first network device receives the first interior gateway protocol (IGP) packet, the method further includes: The first network device broadcasts the first IGP packet in an IGP domain, where the IGP domain includes the first network device and a second network device.

In this optional manner, the blockchain task is transferred to all the network devices in the IGP domain, so that some or all the network devices in the IGP domain can participate in execution of the blockchain task and reach a consensus.

Optionally, after the blockchain task is executed, the method further includes: The first network device generates a second IGP packet, where the second IGP packet includes a first block obtained by the first network device by executing the blockchain task. The first network device broadcasts the second IGP packet in the IGP domain.

In this optional manner, after executing the blockchain task, the network device encapsulates the formed block into an IGP packet and broadcasts the IGP packet, so that the block generated by the network device can be quickly propagated to the entire blockchain network, and the consensus on the block can be reached in the blockchain network.

Optionally, the method further includes:

The first network device receives a third IGP packet from the second network device in the IGP domain, where the third IGP packet includes a second block obtained by the second network device by executing the blockchain task.

The first network device verifies the second block.

If the second block has been verified and a consensus is reached, the first network device stores the second block on a blockchain.

In this optional manner, when another network device is the first one that obtains a result through computation and the other network device generates a block, the first network device verifies the block and adds the block to the chain according to the consensus mechanism. In this way, an accounting function of the blockchain is implemented.

Optionally, before the first network device receives the first interior gateway protocol (IGP) packet, the method further includes:

The first network device creates an IGP process, where the IGP process is used to transmit, in the IGP domain, information associated with the blockchain task.

In this optional manner, configuration is modified for an original IGP network, and an IGP process is added to implement transmission of blockchain network information. The configuration is simple, and implementation complexity is low.

Optionally, the method further includes, if the CPU usage of the first network device is greater than a threshold, the first network device stops executing the blockchain task.

In this optional manner, blockchain computing can be stopped in time when the network device has relatively high load, to reserve the computing power of the network device for a forwarding task. This prevents execution of the blockchain task from affecting the forwarding task, and ensures forwarding performance of the network device.

According to a second aspect, a packet processing method is provided. In the method, a gateway device generates a first interior gateway protocol (IGP) packet in response to a storage request, where the first IGP packet includes a first field, the first field is used to indicate to execute a blockchain task, and the blockchain task is a computing task corresponding to a consensus mechanism in a blockchain network. The gateway device sends the first IGP packet.

A method for constructing a blockchain network based on an IGP is provided. A new IGP packet used to transmit a blockchain task is provided by extending the IGP. The gateway device propagates the new IGP packet in the IGP domain, so that the network device can participate in execution of the blockchain task by using computing power of the network device. The computing power of the network device is maximized to construct the blockchain network, avoiding a waste of idle computing power of the network device. This improves usage of computing resources of the network device. In addition, this addresses a problem that blockchain technology is restricted due to insufficient computing power, and facilitates development of the blockchain technology.

Optionally, that the gateway device sends the first IGP packet includes:

The gateway device broadcasts the first IGP packet in an IGP domain, where the IGP domain includes a plurality of network devices.

Optionally, a first interface of the gateway device is configured to receive the storage request, a second interface of the gateway device is configured to receive a consensus algorithm required for executing the blockchain task, a third interface of the gateway device is configured to allocate the computing power to the blockchain task, and a fourth interface of the gateway device is configured to process an IGP packet.

Optionally, the method further includes:

The gateway device obtains input data to the consensus mechanism.

The gateway device executes, based on the input data, the blockchain task.

Optionally, after the gateway device sends the first IGP packet, the method further includes:

The gateway device receives a second IGP packet, where the second IGP packet includes a block obtained by the network device by executing the blockchain task.

The gateway device verifies the block.

If the block has been verified and a consensus is reached, the gateway device stores the block on a blockchain.

Optionally, the first IGP packet includes a link state advertisement (LSA) header, the LSA header includes a link state (LS) type field, and the first field includes the LS type field.

Optionally, the first IGP packet includes a link state packet protocol data unit (LSP PDU) type field, and the first field includes the LSP PDU type field.

According to a third aspect, a network device is provided. The network device has a function of performing packet processing in the first aspect or any one of the optional manners of the first aspect. The network device includes at least one unit, and the at least one unit is configured to perform the packet processing method provided in the first aspect or any one of the optional manners of the first aspect. For specific details of the network device provided in the third aspect, refer to the first aspect or any one of the optional manners of the first aspect. Details are not described herein again.

According to a fourth aspect, a gateway device is provided. The gateway device has a function of performing packet processing in the second aspect or any one of the optional manners of the second aspect. The gateway device includes at least one unit, and the at least one unit is configured to implement the packet processing method provided in the second aspect or any one of the optional manners of the second aspect. For specific details of the gateway device provided in the fourth aspect, refer to the second aspect or any one of the optional manners of the second aspect. Details are not described herein again.

According to a fifth aspect, a network device is provided. The network device includes a processor and a communications interface. The processor is configured to execute instructions, to enable the network device to perform the packet processing method provided in the first aspect or any one of the optional manners of the first aspect. The communications interface is configured to receive or send a packet. For specific details of the network device provided in the fifth aspect, refer to the first aspect or any one of the optional manners of the first aspect. Details are not described herein again.

According to a sixth aspect, a gateway device is provided. The gateway device includes a processor and a communications interface. The processor is configured to execute instructions, to enable the gateway device to perform the packet processing method provided in the second aspect or any one of the optional manners of the second aspect. The communications interface is configured to receive or send a packet. For specific details of the gateway device provided in the sixth aspect, refer to the second aspect or any one of the optional manners of the second aspect. Details are not described herein again.

According to a seventh aspect, a computer-readable storage medium is provided. The storage medium stores at least one instruction. When the instruction is read by a processor, a network device is enabled to perform the packet processing method provided in the first aspect or any one of the optional manners of the first aspect.

According to an eighth aspect, a computer-readable storage medium is provided. The storage medium stores at least one instruction. When the instruction is read by a processor, a gateway device is enabled to perform the packet processing method provided in the second aspect or any one of the optional manners of the second aspect.

According to a ninth aspect, a computer program product is provided. When the computer program product runs on a network device, the network device is enabled to perform the packet processing method provided in the first aspect or any one of the optional manners of the first aspect.

According to a tenth aspect, a computer program product is provided. When the computer program product runs on a gateway device, the gateway device is enabled to perform the packet processing method provided in the second aspect or any one of the optional manners of the second aspect.

According to an eleventh aspect, a chip is provided. When the chip runs on a network device, the network device is enabled to perform the packet processing method provided in the first aspect or any one of the optional manners of the first aspect.

According to a twelfth aspect, a chip is provided. When the chip runs on a gateway device, the gateway device is enabled to perform the packet processing method provided in the second aspect or any one of the optional manners of the second aspect.

According to a thirteenth aspect, a network system is provided. The network system includes a network device and a gateway device. The network device is configured to perform the method according to the first aspect or any one of the optional manners of the first aspect, and the gateway device is configured to perform the method according to the second aspect or any one of the optional manners of the second aspect.

According to a fourteenth aspect, a network device is provided. The network device includes a main control board and an interface board, and may further include a switching board. The network device is configured to perform the method in the first aspect or any one of the optional manners of the first aspect. Specifically, the network device includes a unit configured to perform the method according to the first aspect or any one of the optional manners of the first aspect. In a possible implementation, an inter-process communication (IPC) channel is established between the main control board and the interface board in the network device. The main control board and the interface board communicate with each other through the IPC channel.

According to a fifteenth aspect, a gateway device is provided. The gateway device includes a main control board and an interface board, and may further include a switching board. The gateway device is configured to perform the method in the second aspect or any one of the optional manners of the second aspect. Specifically, the gateway device includes a unit configured to perform the method according to the second aspect or any one of the optional manners of the second aspect. In a possible implementation, an IPC channel is established between the main control board and the interface board in the gateway device. The main control board and the interface board communicate with each other through the IPC channel.

DESCRIPTION OF EMBODIMENTS

Figure 1:
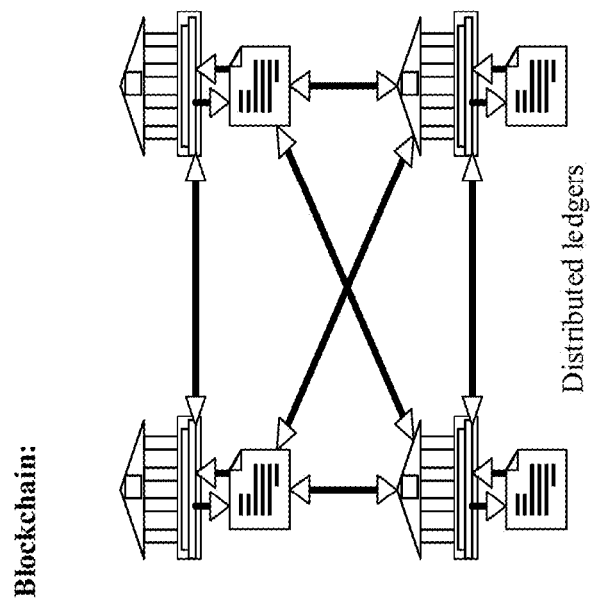
FIG. 1 is a schematic diagram of implementing decentralized accounting based on a blockchain network according to an embodiment of this application.
Figure 1:
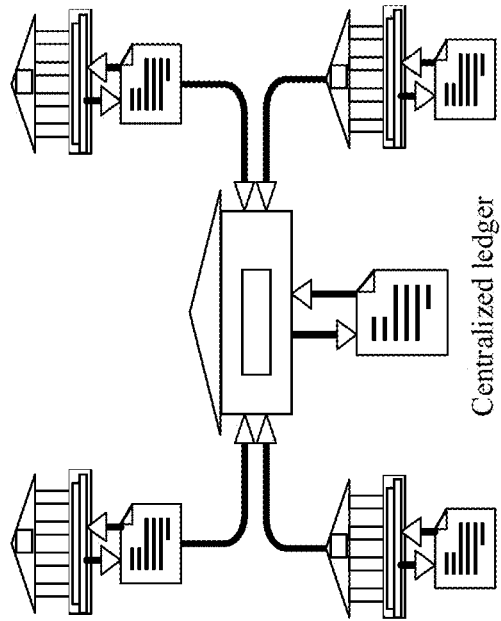

To make the objectives, technical solutions, and advantages of this application clearer, the following further describes embodiments of this application in detail with reference to the accompanying drawings.

The embodiments of this application relate to a blockchain technology. For ease of understanding, the following first describes related concepts such as terms related to the blockchain technology in the embodiments of this application.

(1) Blockchain Network

In essence, a blockchain network is a shared database that stores data or information with "unforgeable", "full-process tracking", "traceable". "open and transparent", "collectively maintainable", and other features. With these features, a blockchain technology based on a trust mechanism facilitates strong collaboration, and has found applications in wide areas. There are four basic technological engines behind a blockchain network: hash operation, digital signature, peer-to-peer (P2P) network, and consensus algorithm.

(2) Consensus Algorithm

There is an unavoidable problem in the design of a distributed system cluster: consistency. A series of specified operations are performed on a plurality of service nodes in a system and operation results are obtained. The operation results need to be verified and accepted by all the service nodes, to ensure consistency (to reach a consensus on the operation results). A consensus algorithm can provide such a technical mechanism to establish consistency (trust) in an untrusted environment. The consensus algorithm is a collective term for a type of algorithms, including many specific algorithms.

(3) P2P Network

A peer-to-peer computer network is a distributed application architecture that distributes tasks and workloads between peers. The P2P network is a networking or network form established based on a peer-to-peer computing model at an application layer. In a P2P network environment, a plurality of interconnected computers are equally privileged, have same functions, and do not have a primary/secondary relationship. A computer can serve as a server and provide shared resources for other computers in a network, and can also serve as a workstation. The entire network does not depend on a dedicated centralized server or a dedicated workstation. Each computer in the network can serve as a requester of a network service, and can also respond to a request of another computer to provide a resource, a service, and content. Generally, these resources and services include: information sharing and exchange, computing resource (such as central processing unit (CPU) computing capability sharing), storage sharing (such as use of a cache and disk space), network sharing, printer sharing, and the like.

(4) Hash (Hash) Operation

In short, a hash operation is a message digest algorithm or function that compresses a message of any length into a fixed length. For example, the hash operation is an SHA256 operation. The SHA256 operation is a hash operation whose hash value is 256 bits. SHA stands for secure hash algorithm.

(5) Interior Gateway Protocol (IGP)

The IGP is a protocol used to exchange routing information between gateways (hosts and routers) in an autonomous network. The routing information can be used to describe how routing is carried out by an internet protocol (IP) or other network protocols. The IGP protocol includes routing information protocol (RIP), open shortest path first (OSPF), intermediate system to intermediate system (IS-IS), interior gateway routing protocol (IGRP), enhanced interior gateway routing protocol (EIGRP), and protocol independent multicast routing protocol (PIM).

(6) Blockchain Task

A blockchain task is a computing task corresponding to a consensus mechanism of a blockchain network. Optionally, a process of executing the blockchain task is a process of solving a computation problem. The computation problem is difficult to solve and is easy to verify. By solving the computation problem, all nodes in the blockchain network can reach a "consensus".

A hash operation is usually required in the execution of a blockchain task. For example, an execution process of the blockchain task includes: performing iteration on a nonce by using a script; computing a hash value based on the current nonce after each iteration; determining whether the hash value is less than a target value; if the hash value is not less than the target value, modifying the nonce (for example, increases the nonce by 1) and performing re-computation until the hash value is less than the target value. For example, a blockchain task is "adding a value to a given character string, where a result of a hash operation (for example, SHA25) performed on the character string obtained after the adding is 0", where 0 is an example of the target value. The consensus mechanism is, for example, a proof of work (PoW). Because the consensus mechanism can prove that a device has done enough work and found a correct nonce, a nonce obtained through computing is a proof of work.

The foregoing describes some terms and concepts in the blockchain technology. The following briefly describes application of the blockchain technology.

Figure 2A:
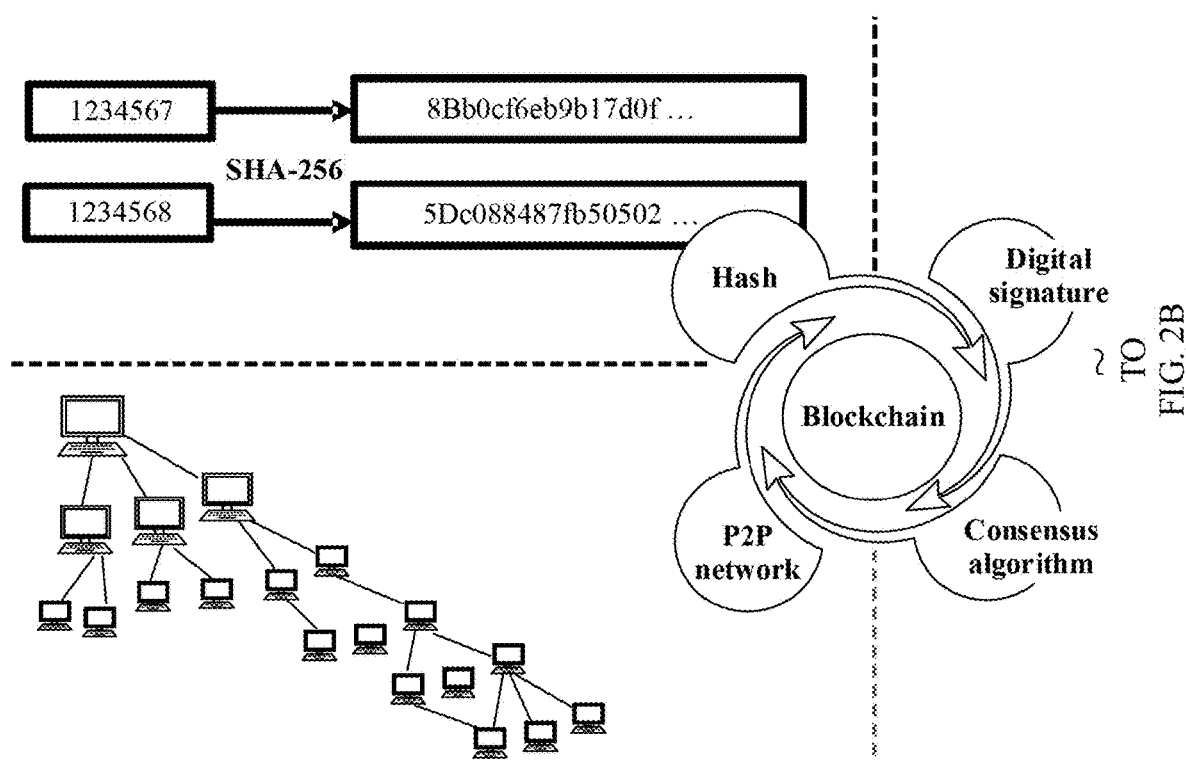
FIG. 2A and FIG. 2B are a schematic diagram of a blockchain technology according to an embodiment of this application.
Figure 2B:
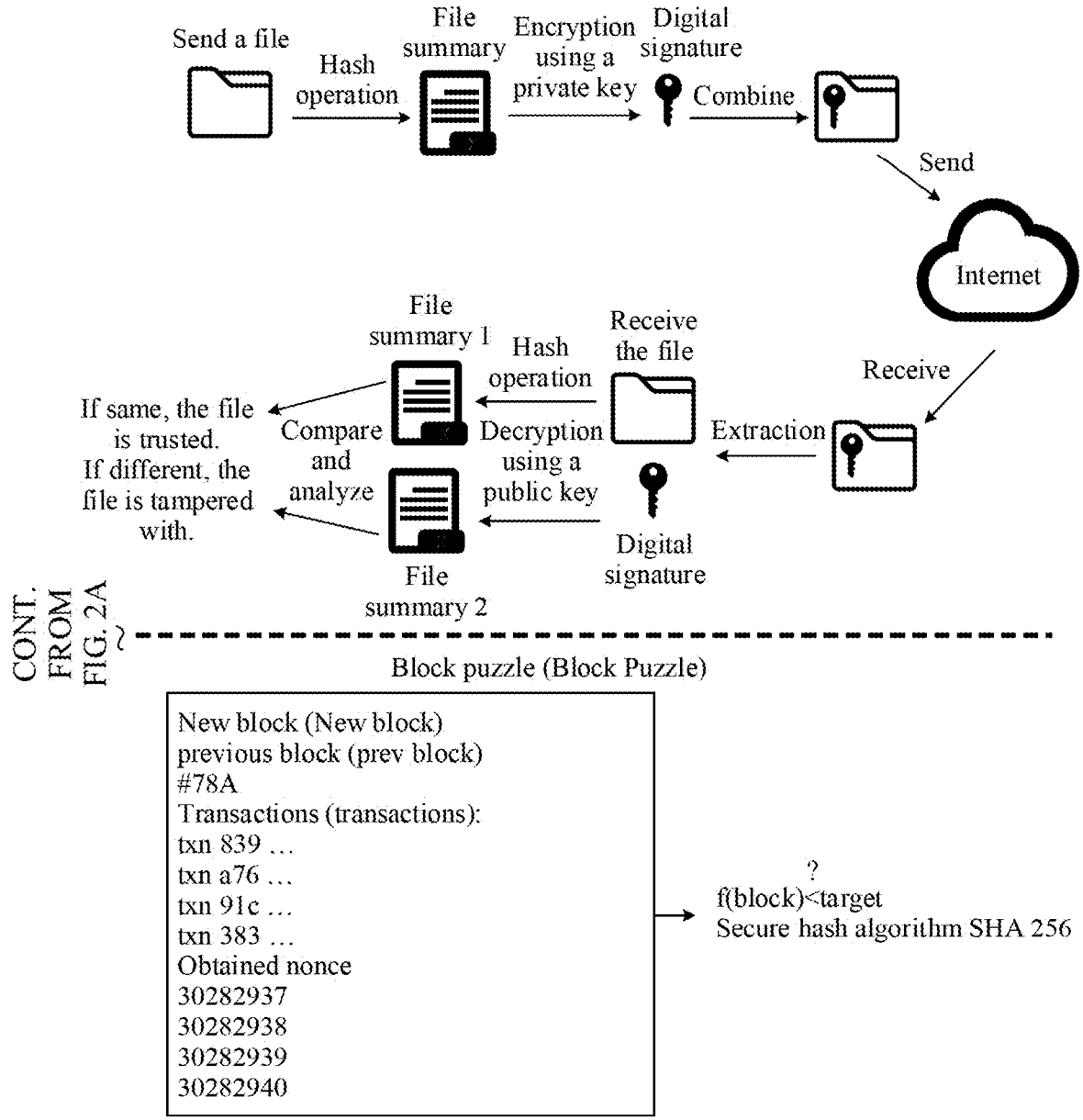

Refer to FIG. 1. FIG. 1 is an example of implementing decentralized accounting in a blockchain network. A blockchain is a distributed accounting technology in an untrusted environment, and builds trust by using a technical mechanism to implement decentralization. Refer to FIG. 2A and FIG. 2B. The blockchain mainly uses four basic technologies: hash operation (SHA256), digital signature, P2P network, and consensus algorithm. The consensus algorithm usually needs to consume a large amount of computing power to unify a distributed system.

However, innovation in the blockchain field faces a problem of limited computing power. Specifically, a considerable amount of dedicated hardware needs to be invested in blockchain construction, and especially, a large amount of computing power needs to be consumed to reach a "consensus" between nodes in the blockchain. Blockchains are classified into public blockchains and industry blockchains. A public blockchain (for example, bitcoin) has a large number of "miners" to support computing power of a blockchain network. An industry blockchain requires investment in dedicated hardware, driving up costs. When hardware costs are higher than benefits brought by the blockchain technology to the industry, the development of the industry blockchain is greatly restricted.

In addition, a large amount of idle computing power can be explored and monetized from a telecom carrier's infrastructure. Specifically, there is a large amount of idle computing power in the carrier's network infrastructure. For example, there are tens of thousands of network devices in a municipal IP-based radio access bearer network (IPRAN). According to big data statistics, average CPU usage of these devices is lower than 20%. A capability of converting idle computing power into cash reaches approximately US$1.6 million per year.

In view of this, an embodiment provides a method for constructing a blockchain network based on an IGP. By extending the IGP, a network device can participate in distributed computing of a blockchain, so that the carrier's existing network infrastructure can be reused to construct the blockchain. The telecom carrier can flexibly lease idle computing power of the network infrastructure, which is used to construct blockchains for vertical industries. This helps create a healthy ecosystem for the industry, and facilitates the innovation and engineering implementation of a blockchain technology in the industry.

The following separately describes, from the perspectives of hardware and software, a system architecture provided in the embodiments of this application.

Figure 3:
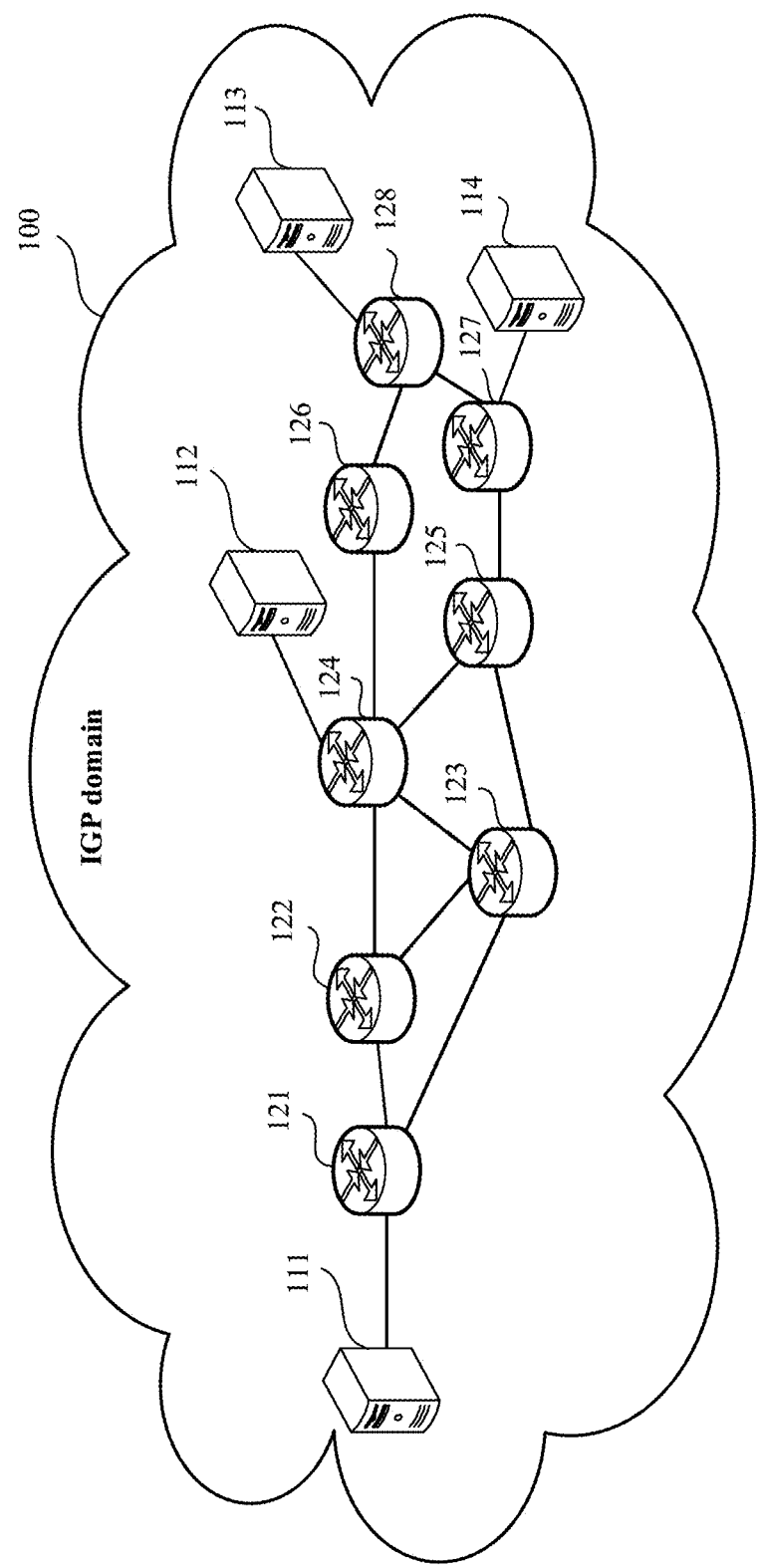
FIG. 3 is a schematic diagram of a system architecture according to an embodiment of this application.

Refer to FIG. 3. An embodiment of this application provides a system architecture 100. The system architecture 100 is an example of a blockchain network constructed by using an IGP. Different devices in the system architecture 100 communicate based on the IGP. All the devices in the system architecture 100 optionally belong to a same IGP domain. The system architecture 100 includes at least one gateway device and at least one network device. The gateway device is connected to the network device, and different network devices are connected to each other through a wireless or wired network.

The gateway device is, for example, referred to as a blockchain gateway (BCGW). For example, the gateway device is a BCGW 111, a BCGW 112, a BCGW 113, and a BCGW 114 shown in FIG. 3. The gateway device is, for example, a blockchain dedicated gateway node. The gateway device distributes and maintains a blockchain task in a southbound direction, and provides an interface for subscribing to blockchain data in a northbound direction. The gateway device joins a specific IGP process, and publishes a blockchain task to a network in a broadcast manner by using an IGP packet in a special format shown in FIG. 3, or receives a block obtained by executing a blockchain task. A form of the gateway device is, for example, a computing device, a server, a router, a switch, or the like. Optionally, the BCGW does not need to be centrally constructed. Any network device may be added to any network node to serve as the BCGW in an IGP domain, release a blockchain task, collect a block, and the like. For a hardware structure of the gateway device, refer to FIG. 13 and the descriptions corresponding to a gateway device 800. For a software architecture of the gateway device, refer to FIG. 4 and the descriptions corresponding to a system architecture 200.

The gateway device is connected to an external system through a wireless or wired network. The external system is not shown in FIG. 3. The external system is a device or system that is not added to an IGP domain. For example, the external system is a third-party service system or a terminal device. The external system may send to-be-stored data to the gateway device, to trigger the following method 300 or method 400 to store the data on a blockchain by using a blockchain network provided in the system architecture 100.

The network device is, for example, a router (Router) or a switch. For example, the network device is a router 121, a router 122, a router 123, a router 124, a router 125, a router 126, a router 127, or a router 128 shown in FIG. 3. The network device is configured to carry a forwarding service of a network, and may participate in a blockchain task by using idle computing power of the network device. The IGP process that is the same as that of the gateway device is configured for the network device. The network device is added to the IGP process by sending an IGP packet to the gateway device, or by using another manner. The network device receives a blockchain task by using an IGP packet in a special format shown in FIG. 5, or broadcasts, to the network, a block obtained by executing the blockchain task. For a hardware structure of the network device, refer to FIG. 12 and descriptions corresponding to a network device 700. For a software architecture of the network device, refer to FIG. 4 and descriptions corresponding to the system architecture 200.

In some embodiments, the system architecture 100 is established by using a network infrastructure provided by a telecom carrier, and both the gateway device and the network device are devices in the carrier's infrastructure. For example, the network device is a router in an IPRAN network. A blockchain network may be constructed by reusing the carrier's infrastructure. This can maximize the carrier's existing infrastructure for industry blockchain construction, develop a new installed base market, avoid using dedicated hardware for blockchain construction, and reduce costs of blockchain network construction.

In addition, this can fully utilize advantages of the carrier' infrastructure in computing power, geographical coverage, service provisioning, and the like. In particular, the blockchain network requires stable computing power. Otherwise, there is a 51% probability that a ledger may be attacked and tampered with. The blockchain network that is constructed by reusing the carrier's infrastructure can provide 99.9999% computing power reliability. In addition, geographical coverage of the carrier's network is very high. A blockchain user can use a blockchain service provided by the carrier anytime and anywhere. In addition, the carrier's service provisioning is highly automated and can be elastically leased or leased at different time. This provides small- and medium-sized enterprises with cost-effective and efficient choices for establishing private blockchain services.

The foregoing describes a hardware structure of the blockchain network constructed based on the IGP. The following describes a software architecture required by the blockchain network constructed based on the IGP.

Figure 4:
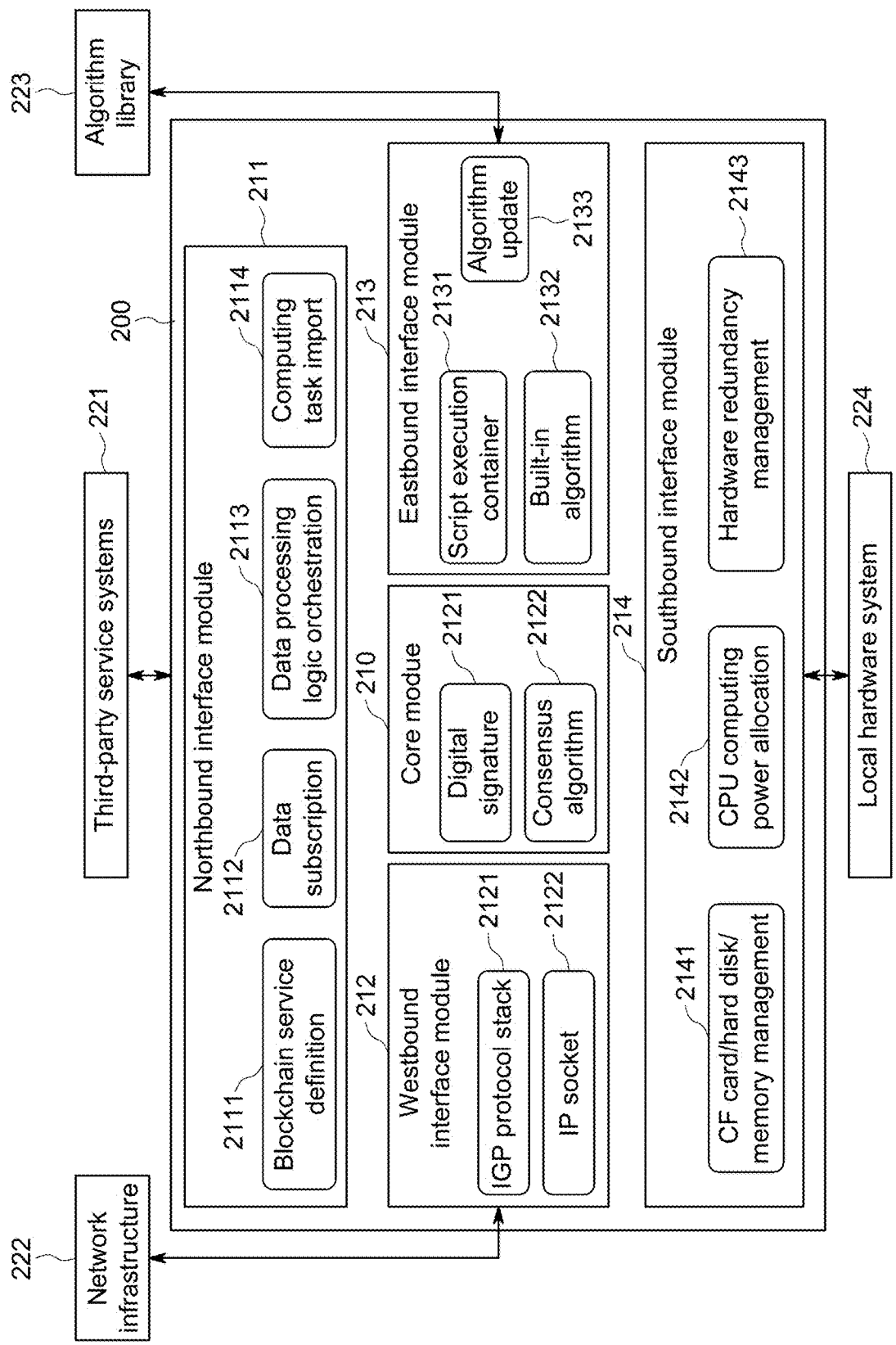
FIG. 4 is a schematic diagram of a system architecture according to an embodiment of this application.

Refer to FIG. 4. An embodiment provides another system architecture 200. The system architecture 200 is an example of the software architecture required by the blockchain network constructed based on the IGP. The system architecture 200 is deployed on each device in the foregoing system architecture 100. In other words, each device in the system architecture 100 may implement a function of the blockchain by using software shown in the system architecture 200.

The system architecture 200 includes a core module 210, a northbound interface module 211, a westbound interface module 212, an eastbound interface module 213, and a southbound interface module 214.

The northbound interface module 211 is connected to a third-party service system 221. The northbound interface module 211 includes a blockchain service definition submodule 2111, a data subscription submodule 2112, a data processing logic orchestration submodule 2113, and a computing task import submodule 2114. When the third-party service system 221 needs to perform accounting, the third-party service system 221 may initiate a request to the northbound interface module 211, and the northbound interface module 211 creates a blockchain task and imports the blockchain task to the IGP domain.

The westbound interface module 212 is connected to a network infrastructure 222. The westbound interface module 212 includes an IGP protocol stack submodule 2121 and an IP socket (IP socket) submodule 2122, to perform IGP protocol processing, packet encapsulation domain processing, and the like.

The core module 210 includes a digital signature submodule and a consensus algorithm submodule.

The eastbound interface module 213 is connected to and accesses an algorithm library 223, to obtain a consensus algorithm stored in the algorithm library 223. The eastbound interface module 213 includes a script execution container submodule 2131, a preset algorithm submodule 2132, and an algorithm update submodule 2133. The algorithm update submodule 2133 is configured to update a consensus algorithm. Specifically, because a blockchain task needs to invoke various algorithms, and a blockchain is different in versions, a specific consensus algorithm also frequently changes based on a service requirement. The algorithm update submodule 2133 is set to dynamically update an algorithm used by a device to execute the blockchain task.

The southbound interface module 214 communicates with a local hardware system 224, and is configured to operate a hardware facility of the network device, to adapt to a blockchain task. The southbound interface module 214 includes a flash memory (CF) card/hard disk/memory management submodule 2141, a CPU computing power allocation submodule 2142, and a hardware redundancy management submodule 2143.

The foregoing separately describes, based on the system architecture 100 and the system 200, the hardware structure and the software architecture of the blockchain network constructed based on the IGP. In some embodiments, based on the system architecture 100 and the system 200, several IGP processes are newly added to a network, and the IGP process is used to transmit information associated with a blockchain task in an IGP domain. For example, the IGP process is used to transmit the blockchain task, or the IGP process is used to transmit a block obtained by executing the blockchain task. Optionally, a plurality of IGP processes are created on each network device. A first IGP process is specially used to carry a blockchain task, and a second IGP process is used to process a route and a topology. The first IGP process and the second IGP process have different process numbers.

Optionally, the IGP process used to transmit the information associated with the blockchain task is an OSPF process. Specifically, an OSPF process is added to a network. The OSPF process is only used to carry a blockchain task. To be specific, the OSPF process is used to, by using a special link state advertisement (LSA) packet, flood the blockchain task and publish a block.

For example, in the system architecture 100 shown in FIG. 3, the following OSPF configuration is added to all network devices:

\#
ospf 20
   block-chain enable //Note: The OSPF process does not process a route or a topology, but completes the blockchain task only by exchanging LSA information.
   cpu-limit 50 //Note: If CPU usage exceeds 50%, block chain computing is stopped to prevent an original forwarding service from being affected.
   area 0.0.0.0
     network x.x.x.x //Note: An interface is bound and added to a blockchain domain.
\#

Based on the preceding configuration on each network device, an OSPF process is created based on a process ID 20, to obtain the OSPF process 20. The interface is advertised to the OSPF process 20. Each network device uses the OSPF process 20 to establish an OSPF neighbor relationship with other network devices. After the OSPF neighbor relationship is established, the network device receives the blockchain task by using a special LSA packet. The OSPF process whose OSPF process ID is 20 is an example of a newly added IGP process used to transmit the information associated with the blockchain task.

In the foregoing manner, the IGP protocol of the network infrastructure is fully reused, and the blockchain network information can be transferred by modifying configuration of an original IGP network. This facilitates rapid deployment of a blockchain service and easy maintenance.

Figure 5:
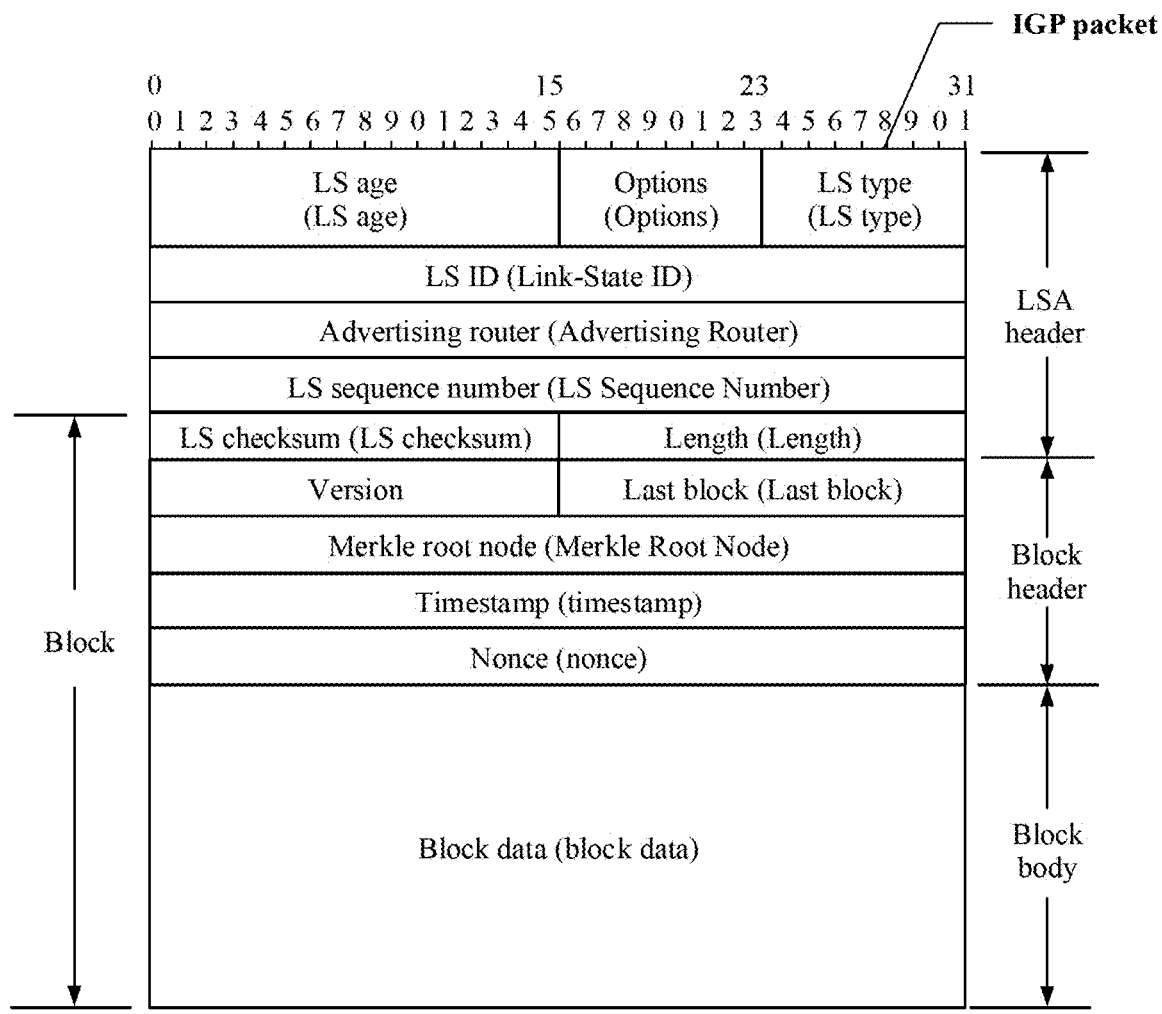
FIG. 5 is a schematic diagram of a format of an IGP packet according to an embodiment of this application.

In this embodiment, a new IGP packet is designed, and the new IGP packet is used to propagate a blockchain task. The IGP packet includes but is not limited to any type of multicast protocol packets. For example, the IGP packet is an IS-IS packet, an OSPF packet, a RIP packet, an LLDP packet, a PIM packet, or the like. Refer to FIG. 5. FIG. 5 is a schematic diagram of a format of the IGP packet for propagating a blockchain task. The IGP packet includes an LSA header and a block.

The LSA header uses a standard structure of an IGP LSA packet. The LSA header contains an LS age (LS age) field, an option, an LS type field, an LS ID (Link-State ID) field, an advertising router field, an LS sequence number field, an LS checksum field, and a length field.

The block includes a block header and a block body.

The block header is a standard information header in the blockchain technology. The block header includes a version number field, a last block field, a blockchain root node (Merkle Root Node) field, a timestamp field, and a random or non-repeated random value that is used only once (Number used once or Number once, nonce) field. Optionally, the block header belongs to a payload of the IGP packet.

The version number field is used to indicate a version number, for example, a version of a consensus algorithm used by a blockchain task. The version number is, for example, 32 bytes. A size of the block field is, for example, four bytes. The last block field is used to index a previous block (namely, a parent block of a current block). For example, the last block field is used to carry a hash value of the previous block. A size of the last block field, for example, the blockchain root node field, is used to identify a root node of a blockchain to which the block belongs, to indicate a ledger to which block data belongs. The timestamp field is used to indicate the time at which the block is generated.

The nonce field is used to carry a random number, that is, a hash algorithm issue. A size of the nonce field is, for example, four bytes.

The block body is used to carry the block data. The block data (block data) is a data body that needs to be accounted. Optionally, the block data belongs to the payload of the IGP packet. The block data may be applied to a plurality of scenarios. Optionally, the block data is used to construct an electronic money transaction system. Alternatively, the block data is used to store a smart contract.

The IGP packet provided in this embodiment includes a first field. The first field is used to indicate to execute a blockchain task. The first field includes one or more fields in the IGP packet shown in FIG. 5. When receiving the IGP packet, a receive end (for example, a network device or a gateway device) may learn of, by identifying the first field, the to-be-executed blockchain task, so that the receive end can participate in accounting.

There are a plurality of implementations of using which field or fields in the IGP packet as the first field. Optionally, the first field is a field in the LSA header. Optionally, the first field is a field in the block header. Alternatively, the first field includes a field in the LSA and a field in the block header. A location in which the first field is carried in the IGP packet is not limited in this embodiment.

Optionally, the IGP packet identifies the blockchain task by using a new LS type. Specifically, the first field includes the LS type field, and a value of the LS type field is used to indicate a blockchain task. The value of the LS type field is also referred to as an LS type number or an LS type value.

For example, for the OSPF protocol, an IGP packet that propagates a blockchain task or a block is an OSPF LSA packet. For example, an LS type number 15 is applied for. A type-15 LSA is used as a special packet for transferring a blockchain task and is preconfigured. When receiving the type-15 LSA, all devices in a network need to broadcast the packet to protocol neighbors in an IGP process. Such a processing mechanism is similar to that of a type-3 LSA (summary LSA with the LS type being 3). The difference between the type-3 LSA and the type-15 LSA is: The type-3 LSA carries routing information, while the type-15 LSA carries a blockchain task. After receiving an OSPF LSA packet, all network devices or gateway devices identify a value of an LS type field. If it is determined that the value of the LS type field is 15, it may be learned that the OSPF LSA packet is used to transmit a blockchain task or a block obtained through computing. 15 is an example of a newly applied LS type number. In some other embodiments, an unoccupied LS type number other than 15 is used to identify a blockchain task. A specific value of the LS type field is not limited in this embodiment.

For example, for the IS-IS protocol, an IGP packet that propagates a blockchain task or a block is a link state protocol (LSP) packet, and the LSP packet identifies the blockchain task by using a new LSP protocol data unit (PDU) type (LSP PDU type). Specifically, the IGP packet includes an LSP PDU type field, and the LSP PDU type field is used to identify a PDU type. The first field includes an LSP PDU type field. For example, an LSP PDU type 155 is applied for. An LSP packet with the LSP PDU type is used as a special LSP packet for transferring a blockchain task and is preconfigured. When receiving the LSP packet whose LSP PDU type is 155, all network devices need to broadcast packet content to protocol neighbors. Such a processing mechanism is the same as that of an LSP packet of another type. 155 is an example of a newly applied LS type number. In some other embodiments, an unoccupied LSP PDU type number other than 155 is used to identify a blockchain task. A specific value of the LSP PDU type field is not limited in this embodiment.

Optionally, the first field includes only one field: the LS type field. Alternatively, the first field not only includes the LS type field, but also includes a field other than the LS type field. Optionally, the first field includes only one field: the LSP PDU type field. Alternatively, the first field not only includes the LSP PDU type field, but also includes a field other than the LSP PDU type field.

For example, the first field includes the LS type field and the nonce field. The nonce field is an example for describing a field other than the LS type field in the first field. After receiving the IGP packet, the receive end identifies the LS type field and the nonce field in the IGP packet, determines whether a value of the LS type field is the newly applied LS type number (for example, 15) related to the blockchain, and determines whether the nonce field has a value. If the value of the LS type field is the newly applied LS type number related to the blockchain, and the nonce field is empty, the receive end determines that a node needs to execute the blockchain task. If the value of the LS type field is the newly applied LS type number related to the blockchain, and the nonce field has a value, the receive end determines that the IGP packet includes a block advertised by another node, and verifies the value of the nonce field. If the value of the nonce field is correct, the receive end performs accounting.

It should be noted that there are a plurality of implementations of the format of the IGP packet for propagating a blockchain task or a block provided in this embodiment. FIG. 5 shows an example of a format of a packet for propagating a blockchain task based on the OSPF protocol. The format of the IGP packet for propagating a blockchain task or a block is not limited to be completely the same as that shown in FIG. 5 in this embodiment. For example, when the blockchain task is propagated based on an IGP protocol other than the OSPF protocol, a packet format may be different from that shown in FIG. 5. Specifically, when the blockchain task or the block is propagated based on multicast protocols such as IS-IS, RIP, LLDP, or PIM, the LSA header shown in FIG. 5 may be replaced with a general header of the multicast protocols such as IS-IS, RIP, LLDP, or PIM. In addition, optionally, when the blockchain task is propagated based on the IGP protocol other than OSPF, the LS type field is not used to indicate the blockchain task, but a type field in a general header of the IGP protocol is used to indicate the blockchain task. Alternatively, an extended new bit (for example, a flag field), an extended new type length value (TLV), or an extended new option in the general header of the IGP protocol is used to indicate the blockchain task.

The foregoing describes the hardware structure, the software architecture, and the packet format of the IGP packet provided in the embodiments of this application. The following describes, by using the method 300 and the method 400 as an example, methods for constructing a blockchain network based on the system architecture and the IGP packet provided above.

Figure 6:
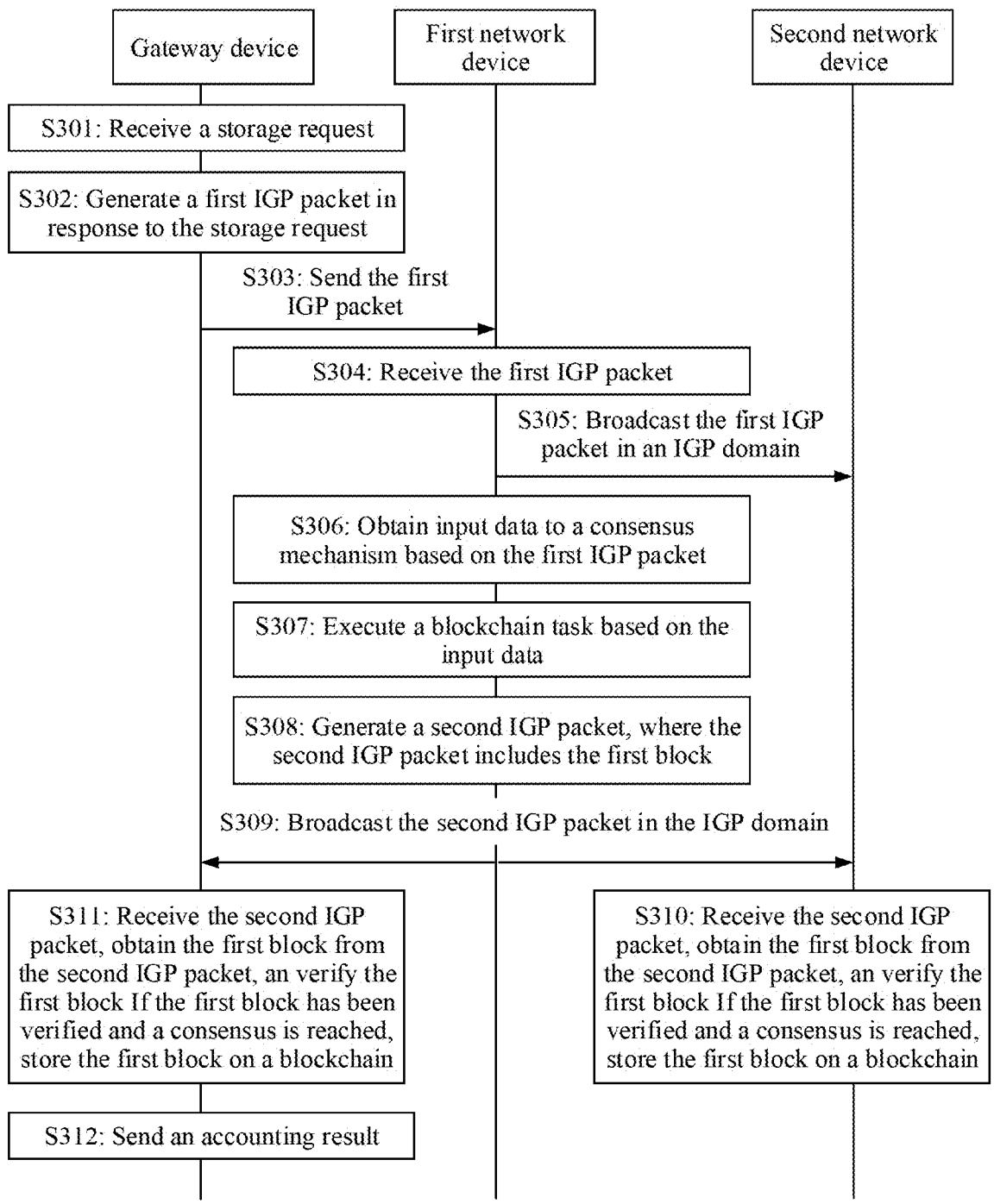
FIG. 6 is a flowchart of a packet processing method according to an embodiment of this application.

Refer to FIG. 6. FIG. 6 is a flowchart of a packet processing method 300 according to an embodiment of this application.

Optionally, the method 300 is performed by a device in the system architecture 100. For example, a gateway device in the method 300 is the BCGW 111, the BCGW 112, the BCGW 113, or the BCGW 114 shown in FIG. 3, and a first network device or a second network device in the method 300 is the router 121, the router 122, the router 123, the router 124, the router 125, the router 126, the router 127, or the router 128 shown in FIG. 3.

Optionally, steps in the method 300 are performed based on units in the system architecture 200. For example, a first interface of the gateway device is configured to receive a storage request. For example, the gateway device receives, by using the northbound interface module 211, a storage request sent by the third-party service system, to perform the following step S301. A second interface of the gateway device is configured to receive a consensus algorithm required for executing a blockchain task. A third interface of the gateway device is configured to allocate computing power to the blockchain task. For example, the gateway device accesses an algorithm library by using the eastbound interface module 213 to obtain the consensus algorithm, accesses a local CPU by using the southbound interface module 214, and allocates CPU computing power to the blockchain task, to execute the blockchain task. A fourth interface of the gateway device is configured to process an IGP packet. For example, the gateway device processes an IGP general header part in the IGP packet by using the IGP protocol stack submodule in the westbound interface module 212. Optionally, the first interface is a northbound interface, the second interface is an eastbound interface, the third interface is a southbound interface, and the fourth interface is a westbound interface.

Optionally, in the method 300, a CPU on a main control board or a CPU on an interface board executes the blockchain task. Optionally, in the method 300, an embedded neural network processing unit (NPU) on the interface board executes the blockchain task. Alternatively, the CPU or the NPU may not be used, and another processor applicable to a hash operation is used to execute the blockchain task. This is not limited in this embodiment. Certainly, different processors may alternatively perform processing work corresponding to different steps. For example, one processor forwards a packet, and another processor executes the blockchain task.

For example, the method 300 includes S301 to S312.

S301: The gateway device receives the storage request.

The storage request is a request to store data on a blockchain, and the storage request includes to-be-stored data. In the blockchain field, the to-be-stored data may be referred to as a transaction, an action of storing data may be referred to as accounting, the storage request may be referred to as an accounting request, and the data is finally stored on the blockchain in a form of a block. Optionally, the storage request received by the gateway device is from an external system located outside an IGP domain. The external system generates the storage request, and sends the storage request to the gateway device. The gateway device receives the storage request.

S302: The gateway device generates a first IGP packet in response to the storage request.

In a possible implementation, each time the gateway device receives a storage request, the gateway device generates an IGP packet in response to the storage request, to trigger a blockchain task in real time based on the received storage request. In another possible implementation, after receiving a storage request, the gateway device starts a timer, and generates an IGP packet in response to the storage request each time the preset duration expires, to periodically trigger a blockchain task.

The first IGP packet includes the first field, so that the first IGP packet can indicate a receive end to execute the blockchain task. For a specific format of the first IGP packet, refer to the description corresponding to FIG. 5. Details are not described herein again. Specifically, the gateway device parses the storage request to obtain the data included in the storage request, and includes the data in the block body part shown in FIG. 5 to obtain the first IGP packet.

S303: The gateway device sends the first IGP packet.

In some embodiments, the gateway device broadcasts the first IGP packet in the IGP domain. The IGP domain includes a plurality of network devices. After the first IGP packet is broadcast in the IGP domain, the to-be-stored data carried in the first IGP packet is sent to each of the plurality of network devices. In this way, each network device can obtain the data and participate in execution of the blockchain task.

S304: The first network device receives the first IGP packet.

S305: The first network device broadcasts the first IGP packet in the IGP domain.

Specifically, the IGP packet that uses protocols such as OSPF, IS-IS, RIP, LLDP, PIM, and the like is a multicast protocol packet. A MAC frame header of the multicast protocol packet includes a specific multicast MAC address, or an IP header includes a specific multicast IP address. Therefore, after receiving the first IGP packet, the first network device replicates and broadcasts the first IGP packet, to propagate the first IGP packet to each neighboring device of the first network device in the IGP domain. After receiving the first IGP packet, the neighboring device of the first network device also replicates and broadcasts the first IGP packet, to send the first IGP packet to a neighboring device of the first network device, and so on. Finally, each network device in the IGP domain receives the first IGP packet.

Figure 7:
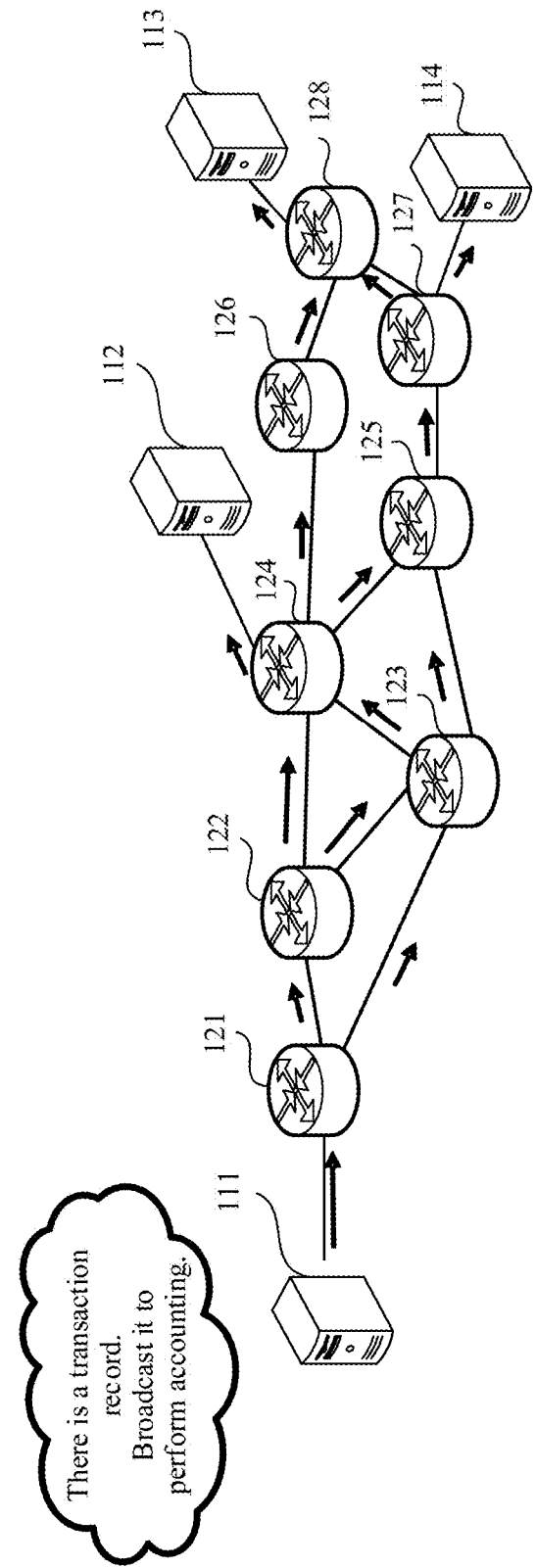
FIG. 7 is a schematic diagram of flooding accounting data by a BCGW into an IGP domain according to an embodiment of this application.

For example, the first IGP packet is an OSPF LSA packet of the type 15, and the type-15 LSA is advertised to all network devices in the IGP domain in a flooding manner, so that all the network devices in the IGP domain participate in an accounting task of the blockchain. Refer to FIG. 7. After receiving an accounting task, the BCGW 111 generates an OSPF LSA packet carrying transaction data, and sends the OSPF LSA packet to the router 121. Then, the router 121 sends the OSPF LSA packet to the neighboring router 122 and the neighboring router 123. Then, the router 122 sends the OSPF LSA packet to the neighboring router 123 and the neighboring router 124. Then, the router 123 and the router 124 separately send the OSPF LSA packet to neighbors of the router 123 and the router 124. Finally, all the network devices in the IGP domain receive the OSPF LSA packet. In other words, the BCGW 111 floods the blockchain task and to-be-accounted data to all the network devices in the IGP domain.

S306: The first network device obtains input data to the consensus mechanism based on the first IGP packet.

The input data to the consensus mechanism is input data to the consensus algorithm of the blockchain, that is, data required for computing a nonce. For example, the input data to the consensus mechanism includes data in a block header of the first IGP packet, for example, a hash value carried in a blockchain root node field and a hash value of a previous block carried in a last block field.

In some embodiments, the first network device identifies the first field in the first IGP packet, and determines, based on a value of the first field, that the blockchain task needs to be executed. In this case, the first network device obtains the input data to the consensus mechanism from the first IGP packet, and then executes the blockchain task. For example, the first network device identifies an LS type field and a nonce field in the first IGP packet, and determines that the LS type field carries a new LS type number used to identify the blockchain task, and that the nonce field is empty. In this case, the first network device participates in execution of the blockchain task.

In some embodiments, all the input data to the consensus mechanism is from the first IGP packet. In some other embodiments, a portion of the input data to the consensus mechanism is from the first IGP packet, and a portion of the input data is locally obtained by the first network device.

S307: The first network device executes the blockchain task based on the input data.

There are a plurality of implementations of executing the blockchain task based on the input data. In some embodiments, the first network device performs a hash operation based on the input data, to obtain a hash value. The first network device determines whether the hash value is less than a target value (the target value is, for example, 0). If the hash value is not less than the target value, the first network device modifies the nonce (for example, increases the nonce by 1), and performs a hash operation again until the hash value is less than the target value.

Optionally, the first network device determines, based on current CPU usage, whether to execute the blockchain task. For details, refer to the following case 1 and case 2.

Case 1: In a process of executing the blockchain task, the first network device detects the CPU usage, and determines whether the CPU usage is greater than a threshold. If the CPU usage of the first network device is greater than the threshold, the first network device stops executing the blockchain task. The threshold is recorded as, for example, "cpu-limit". The threshold is, for example, 50%.

In this manner, blockchain computing can be stopped in time when the network device has relatively high load, to reserve computing power of the network device for a data forwarding task. This prevents execution of the blockchain task from affecting the forwarding task, and ensures forwarding performance of the network device.

Case 2: After suspending the blockchain task, the first network device continues to detect the CPU usage. If the CPU usage of the first network device becomes less than the threshold, the first network device resumes execution of the blockchain task. In this manner, when the network device changes from busy to idle, blockchain computing can be performed in time by using idle computing power of the network device.

In the foregoing case 1 and case 2, the first network device can flexibly choose, based on a current computing power status of the device, whether to participate in the blockchain task. When the first network device is busy, the computing power is preferentially used to execute the forwarding task. When the first network device is idle, the computing power is used to execute the blockchain task. In this way, two types of tasks, namely, the forwarding task and the blockchain task, are effectively combined, to fully improve computing resource usage of the network device.

S308: The first network device generates a second IGP packet.

In some embodiments, each device (for example, the network device and the gateway device) in the IGP domain participates in execution of the blockchain task. When a device in the IGP domain computes and obtains a result (for example, computes a correct nonce) according to the consensus algorithm, the device combines the computation result and the transaction data into a current block, encapsulates the block into the IGP packet, and broadcasts the IGP packet carrying the block in the IGP domain. In this way, the block generated by the device is propagated to a blockchain network. After receiving the block, each device in the blockchain network verifies the computation result. If verification succeeds and a consensus is reached, each device stores the block in the blockchain.

Because any device in the IGP domain may be the first one that obtains the result through computation, this embodiment separately describes cases in which the first network device, another network device other than the first network device, or the gateway device is the first one that obtains the result through computation. In addition, to distinguish blocks generated by different network devices, a block generated by the first network device is referred to as a first block, a block generated by the second network device is referred to as a second block, and a block generated by the gateway device is referred to as a third block. It should be noted that words such as "first". "second", and "third" in terms "first block", "second block", and "third block" are used to distinguish the different blocks, and do not constitute a limitation on an arrangement location of a block on the blockchain.

If the first network device is the first one that obtains the result through computation, after executing the blockchain task, the first network device obtains the first block, and generates the second IGP packet based on the first block. The second IGP packet includes the first block, and the first block includes a nonce and transaction data that are obtained by the first network device through computation. The nonce obtained by the first network device is carried in a nonce field in a block header part of the second IGP packet. The transaction data is carried in a block body part of the second IGP packet. Optionally, the second IGP packet further includes an LSA header. Optionally, the LSA header in the second IGP packet is the same as an LSA header in the first IGP packet.

S309: The first network device broadcasts the second IGP packet in the IGP domain.

S310: The second network device in the IGP domain receives the second IGP packet, obtains the first block from the second IGP packet, and verifies the first block. If the first block has been verified and a consensus is reached, the second network device stores the first block on the blockchain.

For example, if the second network device identifies an LS type field and the nonce field in the second IGP packet, and determines that the LS type field carries a new LS type number used to identify the blockchain task, and that the nonce field has a value, the second network device determines that the second IGP packet includes a block published by another node. The second network device verifies a value of the nonce field. If the value of the nonce field is verified to be correct, the second network device performs accounting.

Similarly, if the second network device is the first one that obtains the result through computation, after executing the blockchain task, the second network device obtains the second block, and generates a third IGP packet based on the second block. The third IGP packet includes the second block, and the second block includes a nonce and transaction data that are obtained by the second network device through computation. The nonce calculated by the second network device is carried in a nonce field in a block header part of the third IGP packet. The transaction data is carried in a block body part of the third IGP packet. The second network device broadcasts the third IGP packet in the IGP domain. The first network device receives the third IGP packet from the second network device, and verifies the second block. If the second block has been verified and a consensus is reached, the first network device stores the second block on the blockchain.

S311: The gateway device receives the second IGP packet, obtains the first block from the second IGP packet, and verifies the first block. If the first block has been verified and a consensus is reached, the gateway device stores the first block on the blockchain.

In addition, if the second network device is the first one that obtains the result through computation, the gateway device receives the third IGP packet, obtains the second block from the third IGP packet, and verifies the second block. If the second block has been verified and a consensus is reached, the gateway device stores the second block on the blockchain.

Optionally, the gateway device not only propagates the to-be-stored data to the network device, but also participates in execution of the blockchain task. Specifically, the gateway device obtains the input data to the consensus mechanism. The gateway device executes the blockchain task based on the input data.

If the gateway device is the first one that obtains the result through computation, after executing the blockchain task, the gateway device obtains the third block, and generates a fourth IGP packet based on the third block. The fourth IGP packet includes the third block, and the third block includes a nonce and transaction data that are obtained by the gateway device through computation. The nonce obtained by the gateway device is carried in a nonce field in a block header part of the fourth IGP packet. The transaction data is carried in a block body part of the fourth IGP packet. The gateway device broadcasts the fourth IGP packet in the IGP domain. The network device (for example, the first network device or the second network device) in the IGP domain receives the fourth IGP packet, obtains the third block from the fourth IGP packet, and verifies the third block. If the third block has been verified and a consensus is reached, the network device stores the third block on the blockchain.

S312: The gateway device sends an accounting result.

Specifically, the gateway device may return the accounting result to a sending end of the storage request, for example, send the accounting result to the external system. The accounting result is, for example, a blockchain that stores transaction data, that is, an entire "ledger".

Figure 8:
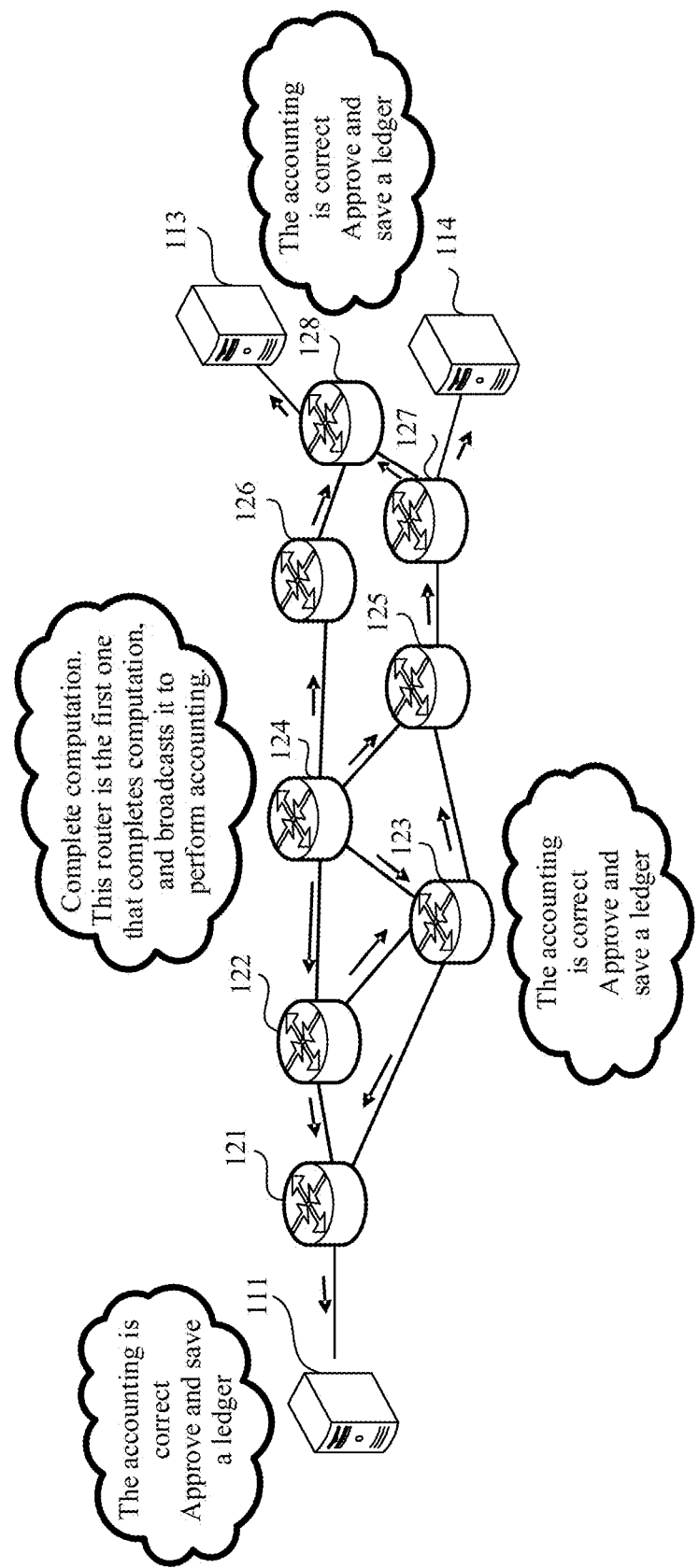
FIG. 8 is a schematic diagram of reaching a consensus and completing accounting by an entire network according to an embodiment of this application.

Refer to FIG. 8. For example, FIG. 8 is a schematic diagram of reaching a consensus on an entire network and completing accounting. FIG. 8 shows an example in which the router 124 is the first one that obtains a result through computation. Specifically, the router 124 first completes computation according to a consensus algorithm (obtains a correct nonce), and broadcasts a block to the entire network by using a special LSA packet. After verifying that the block is correct, other nodes add the block to a blockchain, and stop their own computing tasks. This is equivalent to that all devices in the IGP domain reach a consensus and complete accounting once.

In some embodiments, the blockchain task and a block transmission process described above are implemented by using an IGP process. Specifically, the first network device, the second network device, and the gateway device pre-create an IGP process. For example, the gateway device sends the first IGP packet by using the IGP process running on the gateway device. The first network device receives the first IGP packet by using the IGP process running on the first network device, and sends the second IGP packet by using the IGP process running on the first network device. The second network device receives the first IGP packet by using the IGP process running on the second network device, and sends the third IGP packet by using the IGP process running on the second network device.

An action of broadcasting the IGP packet and an action of executing the blockchain task are not subject to a specific sequence in this embodiment. In some embodiments, S305, S306, and S307 are sequentially performed. For example, S305 is first performed, and then S306 and S307 are performed. For another example, S306 and S307 are first performed, and then S305 is performed. In some other embodiments, S305, S306, and S307 are performed in parallel, that is, are concurrently performed.

This embodiment provides the method for constructing the blockchain network based on the IGP. A new IGP packet for propagating the blockchain task is provided by extending the IGP. When receiving the new IGP packet, the network device can participate in execution of the blockchain task by using computing power of the network device. The computing power of the network device is maximized to construct the blockchain network, to avoid a waste of idle computing power of the network device. This improves usage of computing resources of the network device. In addition, this addresses a problem that a blockchain technology is restricted due to insufficient computing power, and facilitates development of the blockchain technology.

The following describes the method 300 by using the method 400 as an example. In the method 400, a gateway device is a BCGW. A network device is a router. In other words, a procedure of the method described in the method 400 is how the BCGW and the router implement blockchain computing based on an IGP. It should be understood that, for similar steps in the method 400 and the method 300, refer to the method 300. Details are not described in the method 400.

Figure 9:
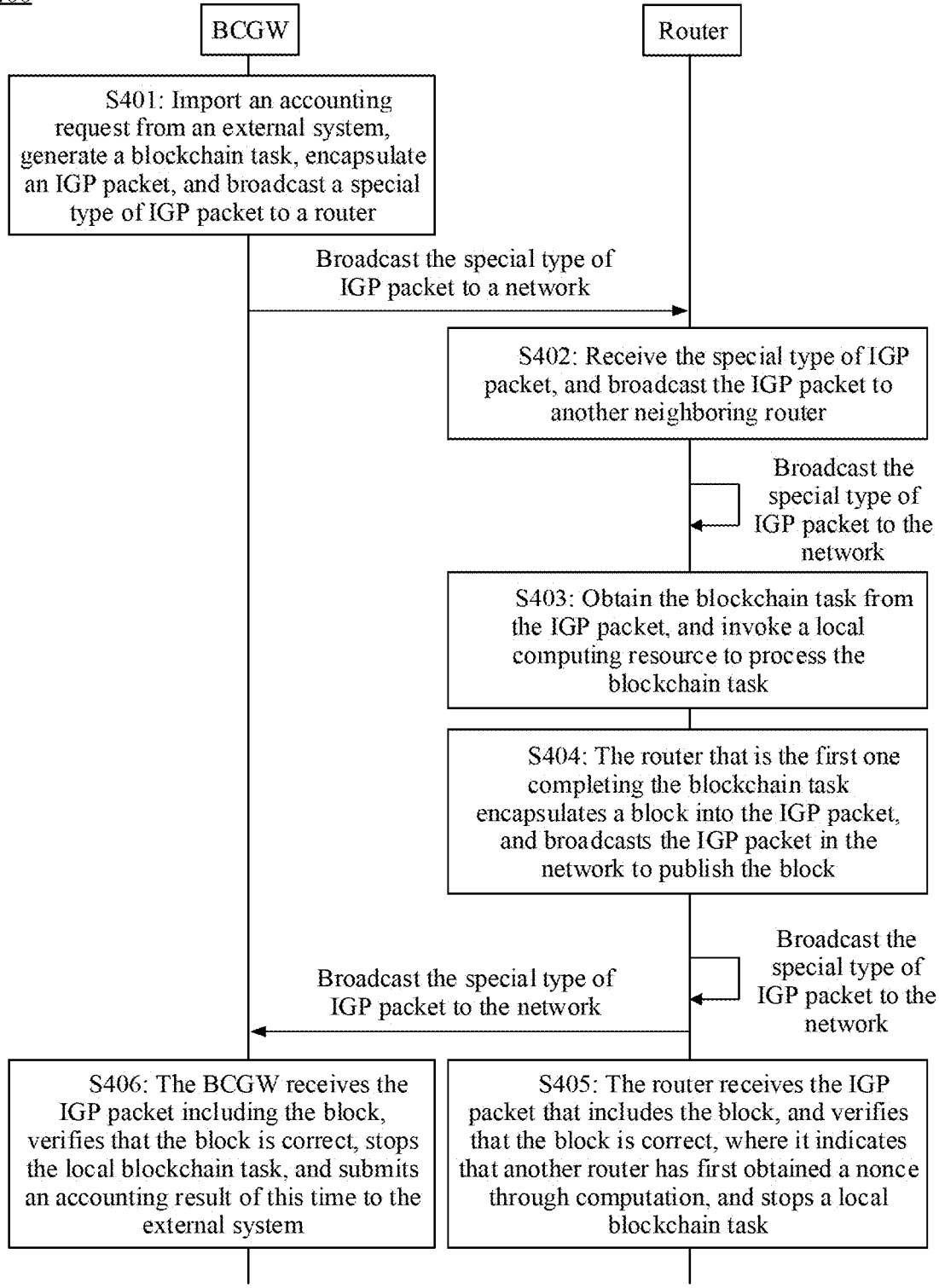
FIG. 9 is a flowchart of a method for performing blockchain computing based on an IGP according to an embodiment of this application.

Refer to FIG. 9. FIG. 9 is a flowchart of the method 400 for performing blockchain computing based on the IGP according to an embodiment of this application. For a special type of IGP packet transmitted in the method 400, refer to the description corresponding to FIG. 5.

For example, the method 400 includes S401 to S406.

S401: The BCGW imports an accounting request from an external system, generates a blockchain task, encapsulates an IGP packet, and broadcasts the special type of IGP packet to the router.

S402: The router receives the special type of IGP packet and broadcasts the IGP packet to another neighboring router.

S403: The router obtains the blockchain task from the IGP packet, and invokes a local computing resource to process the blockchain task.

S404: The router that first completes the blockchain task encapsulates a block into the IGP packet, and broadcasts the IGP packet in a network to publish the block.

S405: The router receives the IGP packet including the block, verifies that the block is correct, where it indicates that another router has first obtained a nonce through computation, and stops a local blockchain task.

S406: The BCGW receives the IGP packet including the block, verifies that the block is correct, stops a local blockchain task, and submits an accounting result of this time to the external system.

The foregoing describes the method 300 or the method 400 in the embodiments of this application. The following describes the network device in the embodiments of this application. The network device described below has any of functions of the first network device or the second network device in the method 300, or has any of functions of the router in the method 400. The gateway device described below has any of functions of the gateway device or the second gateway device in the method 300 or the method 400, or has any of functions of the BCGW in the method 400.

Figure 10:
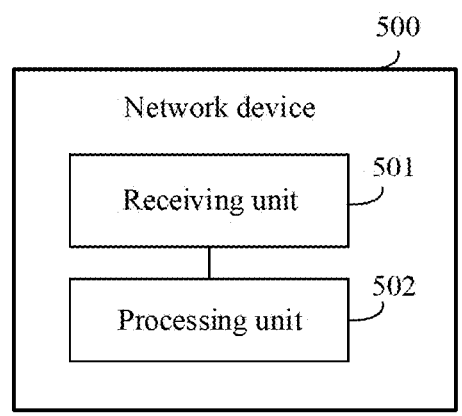
FIG. 10 is a schematic diagram of a structure of a network device according to an embodiment of this application.

FIG. 10 is a schematic diagram of a structure of a network device 500 according to an embodiment of this application. As shown in FIG. 10, the network device 500 includes a receiving unit 501, configured to perform S304; and a processing unit 502, configured to perform S306 and S307.

Optionally, the network device 500 further includes a broadcast unit, configured to perform S305 or S309.

Optionally, the processing unit 502 is configured to perform S308.

Optionally, the processing unit 502 is configured to decide, based on that CPU usage of the network device 500 is less than a threshold, to execute a blockchain task.

Optionally, the receiving unit 501 is further configured to receive a second IGP packet or a third IGP packet.

Optionally, the processing unit 502 is configured to verify a first block or a second block. If the first block has been verified and a consensus is reached, the processing unit 502 stores the first block on a blockchain. Alternatively, if the second block has been verified and a consensus is reached, the processing unit 502 stores the second block on the blockchain.

Optionally, the processing unit 502 is configured to create an IGP process.

Optionally, if the CPU usage of the network device 500 is greater than the threshold, the processing unit 502 is configured to stop executing the blockchain task.

It should be understood that the network device 500 corresponds to the first network device or the second network device in the foregoing method embodiments, and the units in the network device 500 and the foregoing other operations and/or functions are separately used to implement the steps and the methods implemented by the first network device or the second network device in the method 300 or the method 400. For specific details, refer to the method 300 or the method 400. For brevity, details are not described herein again.

It should be understood that, when the network device 500 processes the packet, division into the foregoing functional units is merely used as an example for description. In actual application, the foregoing functions may be allocated to and implemented by different functional units according to a requirement. In other words, an internal structure of the network device 500 is divided into different functional units, to complete all or some of the foregoing functions. In addition, the network device 500 provided in the foregoing embodiment and the method 300 or the method 400 are based on a same idea. For a specific implementation process of the network device 500, refer to the method 300 or the method 400. Details are not described herein again.

Figure 11:
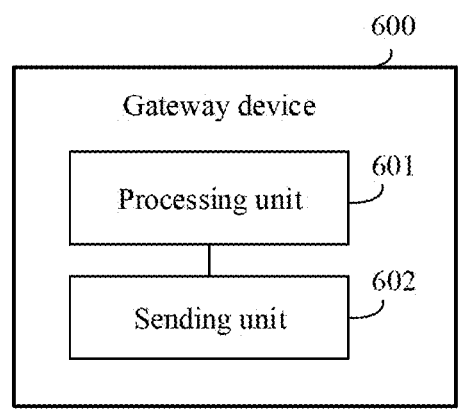
FIG. 11 is a schematic diagram of a structure of a gateway device according to an embodiment of this application.

FIG. 11 is a schematic diagram of a structure of a gateway device 600 according to an embodiment of this application. As shown in FIG. 11, the gateway device 600 includes a processing unit 601, configured to perform S302; and a sending unit 602, configured to perform S303.

Optionally, the sending unit 602 is configured to broadcast a first IGP packet in an IGP domain, where the IGP domain includes a plurality of network devices.

Optionally, a first interface of the gateway device 600 is configured to receive a storage request, a second interface of the gateway device 600 is configured to receive a consensus algorithm required for executing a blockchain task, a third interface of the gateway device 600 is configured to allocate computing power to the blockchain task, and a fourth interface of the gateway device 600 is configured to process an IGP packet.

Optionally, the processing unit 601 is configured to perform S306 and S307.

Optionally, the gateway device 600 further includes a receiving unit, configured to perform S311. The processing unit 601 is configured to verify a block. If the block has been verified and a consensus is reached, the processing unit 601 is configured to store the block on a blockchain.

It should be understood that the gateway device 600 corresponds to the gateway device in the foregoing method embodiments, and the units in the gateway device 600 and the foregoing operations and/or functions are separately used to implement the steps and the methods implemented by the gateway device in the method 300 or the method 400. For specific details, refer to the method 300 or the method 400. For brevity, details are not described herein again.

It should be understood that, when the gateway device 600 processes the packet, division into the foregoing functional units is merely used as an example for description. In actual application, the foregoing functions may be allocated to and implemented by different functional units according to a requirement. In other words, an internal structure of the gateway device 600 is divided into different functional units, to complete all or some of the functions described above. In addition, the gateway device 600 provided in the foregoing embodiment and the method 300 or the method 400 are based on a same or similar idea. For a specific implementation process of the gateway device 600, refer to the method 300 or the method 400. Details are not described herein again.

The following describes a hardware structure of a network device.

The network device 700 corresponds to the first network device or the second network device in the method 300. Alternatively, the network device 700 corresponds to the router in the method 400. The hardware, the modules, and the foregoing other operations and/or functions of the network device 700 are separately used to implement the steps and the methods implemented by the first network device, the second network device, and the router. For a detailed procedure of constructing a blockchain network based on an IGP by the network device 700, refer to the method 300 or the method 400. For brevity, details are not described herein again. The steps of the method 300 or the method 400 are completed by using an integrated logic circuit of hardware in a processor of the network device 700 or instructions in a form of software. The steps in the methods disclosed with reference to the embodiments of this application may be directly performed and completed by a hardware processor, or may be performed and completed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor.

The network device 700 corresponds to the network device 500 shown in FIG. 10. The units in the network device 500 may be implemented by using software of the network device 700. That is, in some embodiments, the units included in the network device 500 may be generated after the processor of the network device 7M) reads program code stored in the memory.

Figure 12:
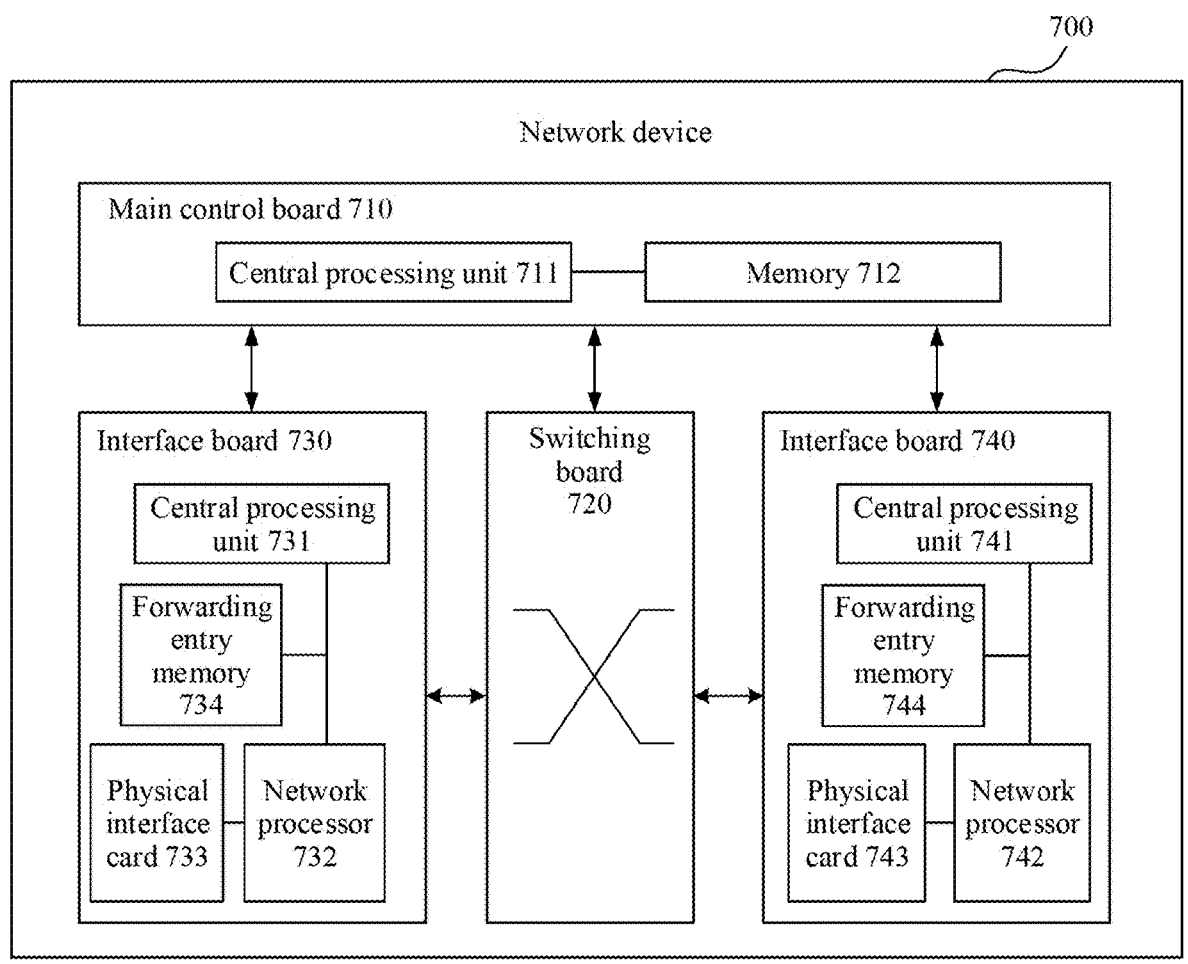
FIG. 12 is a schematic diagram of a structure of a network device according to an embodiment of this application.

Refer to FIG. 12. FIG. 12 is a schematic diagram of a structure of the network device 700 according to an example embodiment of this application. The network device 700 may be configured as a first network device or a second network device. The network device 700 includes a main control board 710 and an interface board 730.

The main control board is also referred to as a main processing unit (MPU) or a route processor card. The main control board 710 is configured to control and manage components in the network device 700, including route computation, device management, and a protocol-based processing function. The main control board 710 includes a central processing unit 711 and a memory 712.

The interface board 730 is also referred to as a line processing unit (LPU), a line card, or a service board. The interface board 730 is configured to provide various service interfaces, and forward a data packet. The service interfaces include but are not limited to an Ethernet interface, a POS (Packet over SONET/SDH) interface, and the like. The Ethernet interface is, for example, a flexible Ethernet service interface (flexible ethernet clients, FlexE Clients). The interface board 730 includes a central processing unit 731, a network processor 732, a forwarding entry memory 734, and a physical interface card (PIC) 733.

The central processing unit 731 on the interface board 730 is configured to control and manage the interface board 730 and communicate with the central processing unit 711 on the main control board 710.

The network processor 732 is configured to implement packet forwarding processing. A form of the network processor 732 may be a forwarding chip. Specifically, the network processor 732 is configured to forward a received packet based on a forwarding table stored in the forwarding entry memory 734. If a destination address of the packet is an address of the network device 700, the network processor 732 sends the packet to a CPU (for example, the central processing unit 711) for processing. If the destination address of the packet is not the address of the network device 700, the network processor 732 searches for, based on the destination address, a next hop and an outbound interface corresponding to the destination address in the forwarding table, and forwards the packet to the outbound interface corresponding to the destination address. An uplink packet is processed as follows: An ingress interface of the packet is processed, and the forwarding table is searched. A downlink packet is processed as follows: The forwarding table is searched.

The physical interface card 733 is configured to implement an interconnection function at a physical layer. Original traffic enters the interface card 730 from the physical interface card 733, and a processed packet is sent through the physical interface card 733. The physical interface card 733, also referred to as a subcard, may be installed on the interface board 730, and is responsible for converting an optical/electrical signal into a packet, performing validity check on the packet, and forwarding the packet to the network processor 732 for processing. In some embodiments, the central processing unit may also perform a function of the network processor 732, for example, implement software forwarding based on a general CPU. Therefore, the network processor 732 is not required in the physical interface card 733.

Optionally, the network device 700 includes a plurality of interface boards. For example, the network device 700 further includes an interface board 740. The interface board 740 includes a central processing unit 741, a network processor 742, a forwarding entry memory 744, and a physical interface card 743.

Optionally, the network device 700 further includes a switching board 720. The switching board 720 may also be referred to as a switch fabric unit (SFU). When the network device has the plurality of interface boards 730, the switching board 720 is configured to complete data exchange between the interface boards. For example, the interface board 730 and the interface board 740 may communicate with each other by using the switching board 720.

The main control board 710 and the interface board 730 are coupled. For example, the main control board 710, the interface board 730, the interface board 740, and the switching board 720 are connected to a system backplane, through a system bus to implement interworking. In a possible implementation, an inter-process communication (IPC) channel is established between the main control board 710 and the interface board 730, and the main control board 710 and the interface board 730 communicate with each other through the IPC channel.

Logically, the network device 700 includes a control plane and a forwarding plane. The control plane includes the main control board 710 and the central processing unit 731. The forwarding plane includes components used for forwarding, for example, the forwarding entry memory 734, the physical interface card 733, and the network processor 732. The control plane performs functions such as a function of a router, generating a forwarding table, processing signaling and protocol packets, and configuring and maintaining a status of a device. The control plane delivers the generated forwarding table to the forwarding plane. On the forwarding plane, the network processor 732 searches the forwarding table delivered by the control plane to forward a packet received by the physical interface card 733. The forwarding table delivered by the control plane may be stored in the forwarding entry memory 734. In some embodiments, the control plane and the forwarding plane may be completely separated, and are not on a same device.

If the network device 700 is configured as the first network device, the network device 700 is configured to perform S304 to S309.

There are a plurality of implementations of performing S304, S306, and S307 by the network device 700. In some embodiments, the physical interface card 733 receives the first IGP packet, the physical interface card 733 sends the first IGP packet to the central processing unit 711 on the main control board 710, and the central processing unit 711 obtains the input data to the consensus mechanism based on the first IGP packet, and executes the blockchain task based on the input data. In some other embodiments, the physical interface card 733 receives the first IGP packet, the physical interface card 733 sends the first IGP packet to the central processing unit 731 on the interface board 730, and the central processing unit 731 obtains the input data to the consensus mechanism based on the first IGP packet, and executes the blockchain task based on the input data. In some other embodiments, the physical interface card 733 receives the first IGP packet, the physical interface card 733 sends the first IGP packet to the NPU (not shown in FIG. 12) on the interface board 730, and the NPU obtains the input data to the consensus mechanism based on the first IGP packet, and executes the blockchain task based on the input data.

There are a plurality of implementations of processing the third IGP packet by the network device 700. In some embodiments, the physical interface card 733 receives the third IGP packet, the physical interface card 733 sends the third IGP packet to the central processing unit 711 on the main control board 710, and the central processing unit 711 verifies the second block. If the second block has been verified and a consensus is reached, the central processing unit 711 stores the second block on the blockchain. For example, the blockchain is stored in the memory 712, and the second block is written into the blockchain stored in the memory 712. In some embodiments, the physical interface card 733 receives the third IGP packet, the physical interface card 733 sends the third IGP packet to the central processing unit 731 on the interface board 730, and the central processing unit 731 verifies the second block. If the second block has been verified and a consensus is reached, the central processing unit 731 stores the second block on the blockchain. For example, the blockchain is stored in the forwarding entry memory 734, and the second block is written into the blockchain stored in the forwarding entry memory 734.

There are a plurality of implementations of performing S308 and S309 by the network device 700. In some embodiments, the network processor 732 generates the second IGP packet, performs encapsulation at the link layer, and sends the second IGP packet through the physical interface card 733 based on information about an outbound interface and other information.

If the network device 700 is configured as the second network device, the network device 700 is configured to perform S310. In some embodiments, the physical interface card 733 receives the second IGP packet, the physical interface card 733 sends the second IGP packet to the central processing unit 711 on the main control board 710, and the central processing unit 711 verifies the first block. If the first block has been verified and a consensus is reached, the central processing unit 711 stores the first block on the blockchain. For example, the blockchain is stored in the memory 712, and the first block is written into the blockchain stored in the memory 712. In some embodiments, the physical interface card 733 receives the second IGP packet, the physical interface card 733 sends the second IGP packet to the central processing unit 731 on the interface board 730, and the central processing unit 731 verifies the first block. If the first block has been verified and a consensus is reached, the central processing unit 731 stores the first block on the blockchain. For example, the blockchain is stored in the forwarding entry memory 734, and the first block is written into the blockchain stored in the forwarding entry memory 734.

It should be understood that an operation performed on the interface board 740 is consistent with an operation performed on the interface board 730 in this embodiment of this application. For brevity, details are not described. It should be understood that the network device 700 in this embodiment may correspond to the first network device or the second network device in the foregoing method embodiments. The main control board 710, and the interface board 730 and/or the interface board 740 in the network device 700 may implement the functions and/or the steps implemented by the first network device or the second network device in the foregoing method embodiments. For brevity, details are not described herein again.

It should be understood that the receiving unit 501 in the network device 500 may be equivalent to the physical interface card 733 or the physical interface card 743 in the network device 700. The processing unit 502 in the network device 500 may be equivalent to the central processing unit 711, the central processing unit 731, the network processor 732, the central processing unit 741, or the network processor 742 in the network device 700.

It should be noted that, there may be one main control board or a plurality of main control boards. When there are the plurality of main control boards, the main control boards may include an active main control board and a standby main control board. There may be one or more interface boards, and a network device having a stronger data processing capability provides more interface boards. There may also be one or more physical interface cards on the interface board. There may be no switching board or there may be one or more switching boards. When there are a plurality of switching boards, load sharing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is performed by using the switching board, to provide large-capacity data exchange and processing capability. Therefore, data access and processing capability of a network device in the distributed architecture is better than that of a device in the centralized architecture. Optionally, the network device in another form may have only one card. For example, there is no switching board, and functions of the interface board and the main control board are integrated on the one card. In this case, a central processing unit on the interface board and a central processing unit on the main control board may be combined into one central processing unit on the card, to perform functions obtained after the two central processing units are combined. A device in this form (for example, a network device such as a low-end switch or router) has a relatively weak data exchange and processing capability. A specific architecture to be used depends on a specific networking deployment scenario. This is not limited herein.

The following describes a hardware structure of a gateway device.

The gateway device 800 corresponds to the gateway device (BCGW) in the method 300 or method 400. The hardware, the modules, and the foregoing other operations and/or functions in the gateway device 800 are separately used to implement the steps and the methods implemented by the gateway device (BCGW) in the method embodiments. For a detailed procedure of performing blockchain computing based on an IGP by the gateway device 800, refer to the method 300 or the method 400. For brevity, details are not described herein again. The steps of the method 300 or the method 40 are completed by using an integrated logic circuit of hardware in a processor of the gateway device 800 or instructions in a form of software. The steps in the methods disclosed with reference to the embodiments of this application may be directly performed and completed by a hardware processor, or may be performed and completed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor.

The gateway device 800 corresponds to the gateway device 600 shown in FIG. 11. The units in the gateway device 600 are implemented by using software of the gateway device 800. In other words, the units included in the gateway device 600 are generated after the processor of the gateway device 800 reads program code stored in the memory.

Figure 13:
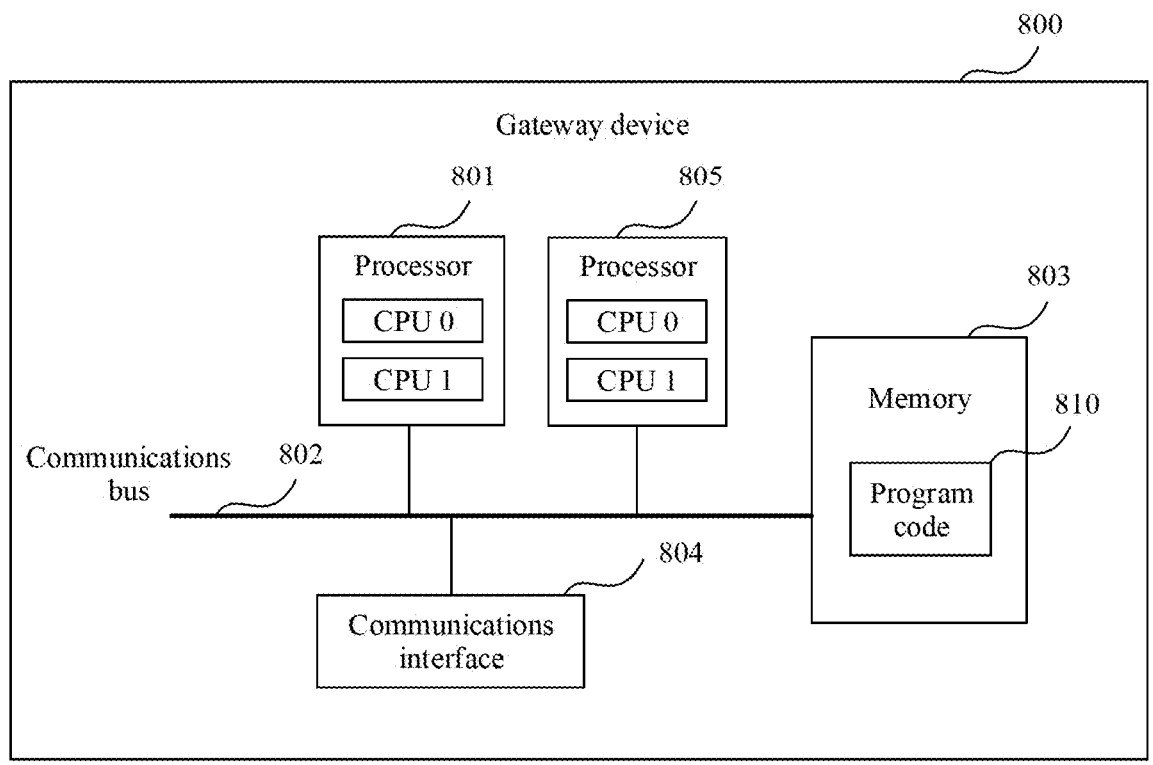
FIG. 13 is a schematic diagram of a structure of a gateway device according to an embodiment of this application.

Refer to FIG. 13. FIG. 13 is a schematic diagram of a structure of the gateway device 800 according to an example embodiment of this application. For example, the gateway device 800 may be a host, a server, a personal computer, or the like. The gateway device 800 may be implemented by using a general bus architecture.

The gateway device 800 includes at least one processor 801, a communications bus 802, a memory 803, and at least one communications interface 804.

The processor 801 may be a general-purpose central processing unit (CPU), a network processor (NP), a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

The communications bus 802 is used to transmit information between the foregoing components. The communications bus 802 may be classified into an address bus, a data bus, a control bus, or the like. For ease of representation, only one thick line is used to represent the bus in FIG. 13, but this does not mean that there is only one bus or only one type of bus.

The memory 803 may be a read-only memory (ROM) or another type of static storage device capable of storing static information and instructions, or may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blu-ray optical disc, or the like), a magnetic disk storage medium or another magnetic storage device, or any other medium capable of carrying or storing expected program code in a form of instructions or a data structure and capable of being accessed by a computer. This is not limited thereto. The memory 803 may exist independently, and is connected to the processor 801 through the communications bus 802. The memory 803 may be integrated with the processor 801.

The communications interface 804 is configured to communicate with another device or a communications network by using any apparatus such as a transceiver. The communications interface 804 includes a wired communications interface, or may include a wireless communications interface. The wired communications interface may be, for example, an Ethernet interface. The Ethernet interface may be an optical interface, an electrical interface, or a combination thereof. The wireless communications interface may be a wireless local area network (WLAN) interface, a cellular network communications interface, or a combination thereof.

During specific implementation, in an embodiment, the processor 801 may include one or more CPUs, for example, a CPU 0 and a CPU 1 shown in FIG. 13.

During specific implementation, in an embodiment, the gateway device 800 may include a plurality of processors, for example, the processor 801 and a processor 805 shown in FIG. 13. Each of the processors may be a single-core processor (single-CPU) or may be a multi-core processor (multi-CPU). The processor herein may refer to one or more devices, circuits, and/or processing cores configured to process data (for example, a computer program instruction).

During specific implementation, in an embodiment, the gateway device 800 may further include an output device and an input device. The output device communicates with the processor 801, and may display information in a plurality of manners. For example, the output device may be a liquid crystal display (LCD), a light emitting diode (LED) display device, a cathode ray tube (CRT) display device, a projector, or the like. The input device communicates with the processor 801, and may receive an input from a user in a plurality of manners. For example, the input device may be a mouse, a keyboard, a touchscreen device, a sensing device, or the like.

In some embodiments, the memory 803 is configured to store program code 810 for executing the solutions of this application, and the processor 801 may execute the program code 810 stored in the memory 803. In other words, the gateway device 800 may implement, by using the processor 801 and the program code 810 in the memory 803, the packet processing method provided in the method embodiments.

The gateway device 800 in this embodiment of this application may correspond to the gateway device in the foregoing method embodiments. In addition, the processor 801, the communications interface 804, and the like in the gateway device 800 may implement the functions of the gateway device and/or the steps and the methods implemented by the gateway device in the foregoing method embodiments. For brevity, details are not described herein.

It should be understood that the sending unit 602 in the gateway device 600 may be equivalent to the communications interface 804 in the gateway device 800. The processing unit 601 in the gateway device 600 may be equivalent to the processor 801 in the gateway device 800.

Figure 14:
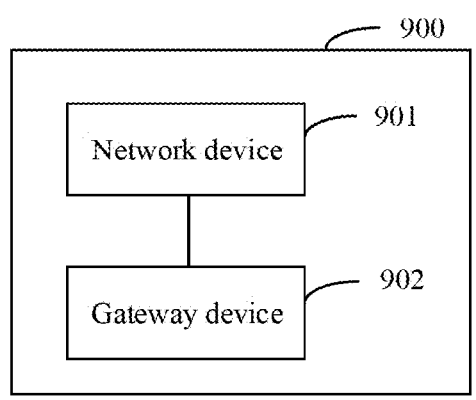
FIG. 14 is a schematic diagram of a structure of a network system according to an embodiment of this application.

Refer to FIG. 14. An embodiment of this application provides a network system 900. The system 900 includes a network device 901 and a gateway device 902. Optionally, the network device 901 is the network device 500 shown in FIG. 10 or the network device 700 shown in FIG. 12, and the gateway device 902 is the gateway device 600 shown in FIG. 11 or the gateway device 800 shown in FIG. 13.

It should be understood that the network device and the gateway device in the foregoing product forms respectively have any of the functions of the first network device, the second network device, or the gateway device in the foregoing method embodiments. Details are not described herein again.

A person of ordinary skill in the art may understand that, the method steps and the units described in the embodiments disclosed in this specification can be implemented by electronic hardware, computer software, or a combination thereof. To clearly describe interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatuses, and units, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units may be merely logical function division, and there may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or the units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for indicating a computer device (which may be a personal computer, a server, or a network device) to perform all or some of the steps of the method described in the embodiments of this application. The foregoing storage medium includes any medium that can store program code, for example, a USB flash drive, a removable hard disk, a read-only memory (ROM), a random access memory (RAM), a magnetic disk, or an optical disc.

In the embodiments of this application, terms such as "first" and "second" are used to distinguish same items or similar items that have basically same functions. It should be understood that there is no logical or time sequence dependency between "first" and "second", and a quantity and an execution sequence are not limited. It should also be understood that although terms such as first and second are used in the following description to describe various elements, these elements should not be limited by the terms. These terms are merely used to distinguish one element from another element. For example, without departing from the scope of the embodiments of this application, the first network device may also be referred to as the second network device. Similarly, the second network device may also be referred to as the first network device. Both the first network device and the second network device may be network devices, and in some cases, may be separate and different network devices.

The term "at least one" in this application means one or more, and the term "a plurality of" in this application means two or more. For example, a plurality of network devices mean two or more network devices. The terms "system" and "network" may be used interchangeably in this specification.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A first network device comprising:
   at least one processor;
   one or more memories coupled to the at least one processor and storing instructions for execution by the at least one processor, the instructions instruct the at least one processor to cause the first network device to:
   receive a first interior gateway protocol (IGP) packet, wherein the first IGP packet comprises a first field, the first field indicates to execute a blockchain task, the blockchain task is a computing task corresponding to a consensus mechanism in a blockchain network, and the blockchain network comprises the first network device;
   obtain input data to the consensus mechanism based on the first IGP packet; and
   execute the blockchain task based on the input data;
   wherein after the receiving the first interior gateway protocol (IGP) packet, the instructions further instruct the at least one processor to cause the network device to broadcast the first IGP packet in an IGP domain, wherein the IGP domain comprises the first network device and a second network device; and
   wherein the instructions further instruct the at least one processor to cause the network device to:
   receive a second IGP packet from the second network device in the IGP domain, wherein the second IGP packet comprises a first block obtained by the second network device by executing the blockchain task;
   verify the first block; and
   if the first block has been verified and a consensus is reached, store the first block on a blockchain.

2. The first network device according to claim 1, wherein the first IGP packet comprises a link state advertisement (LSA) header, the LSA header comprises a link state (LS) type field, and the first field comprises the LS type field; or the first IGP packet comprises a link state packet protocol data unit (LSP PDU) type field, and the first field comprises the LSP PDU type field.

3. The first network device according to claim 1, wherein the instructions further instruct the at least one processor to cause the network device to:
   decide to execute the blockchain task based on that a central processing unit (CPU) usage of the first network device is less than a threshold.

4. The first network device according to claim 1, wherein after executing the blockchain task, the instructions further instruct the at least one processor to cause the network device to:
   generate a third IGP packet, wherein the third IGP packet comprises a second block obtained by the first network device by executing the blockchain task; and
   broadcast the third IGP packet in the IGP domain.

5. The first network device according to claim 1, wherein the instructions further instruct the at least one processor to cause the network device to:
   if the CPU usage of the first network device is greater than a threshold, stop executing the blockchain task.

6. A gateway device comprising:
   at least one processor;
   one or more memories coupled to the at least one processor and storing instructions for execution by the at least one processor, the instructions instruct the at least one processor to cause the gateway device to:
   generate a first interior gateway protocol (IGP) packet in response to a storage request, wherein the first IGP packet comprises a first field, the first field indicates to execute a blockchain task, and the blockchain task is a computing task corresponding to a consensus mechanism in a blockchain network; and send the first IGP packet;
   wherein the instructions further instruct the at least one processor to cause the gateway device to broadcast the first IGP packet in an IGP domain, wherein the IGP domain comprises a plurality of network devices; and wherein after the sending the first IGP packet, the instructions further instruct the at least one processor to cause the gateway device to:
receive a second IGP packet, wherein the second IGP packet comprises a block obtained by a network device by executing the blockchain task;
verify the block; and
if the block has been verified and a consensus is reached, store the block on a blockchain.

7. The gateway device according to claim 6, wherein a first interface of the gateway device is configured to receive the storage request, a second interface of the gateway device is configured to receive a consensus algorithm required for executing the blockchain task, a third interface of the gateway device is configured to allocate computing power to the blockchain task, and a fourth interface of the gateway device is configured to process an IGP packet.

8. The gateway device according to claim 6, wherein the instructions further instruct the at least one processor to cause the gateway device to:
obtain input data to the consensus mechanism; and
execute the blockchain task based on the input data.

9. The gateway device according to claim 6, wherein the first IGP packet comprises a link state advertisement (LSA) header, the LSA header comprises a link state (LS) type field, and the first field comprises the LS type field; or
the first IGP packet comprises a link state packet protocol data unit (LSP PDU) type field, and the first field comprises the LSP PDU type field.

10. A network system, wherein the system comprises a network device and a gateway device,
the network device comprises:
at least one processor;
one or more memories coupled to the at least one processor and storing instructions for execution by the at least one processor, the instructions instruct the at least one processor to cause the network device to:
receive a first interior gateway protocol (IGP) packet from the gateway device, wherein the first IGP packet comprises a first field, the first field indicates to execute a blockchain task, the blockchain task is a computing task corresponding to a consensus mechanism in a blockchain network, and the blockchain network comprises the first network device;
obtain input data to the consensus mechanism based on the first IGP packet; and
execute the blockchain task based on the input data;

wherein after the receiving the first interior gateway protocol (IGP) packet, the instructions further instruct the at least one processor to cause the network device to broadcast the first IGP packet in an IGP domain, wherein the IGP domain comprises the first network device and a second network device; and wherein the instructions further instruct the at least one processor to cause the network device to:
receive a second IGP packet from the second network device in the IGP domain, wherein the second IGP packet comprises a first block obtained by the second network device by executing the blockchain task;
verify the first block; and
if the first block has been verified and a consensus is reached, store the first block on a blockchain; and
the gateway device comprises:
at least one processor;
one or more memories coupled to the at least one processor and storing instructions for execution by the at least one processor, the instructions instruct the at least one processor to cause the gateway device to:
generate the first IGP packet in response to a storage request, wherein the first IGP packet comprises the first field; and
send the first IGP packet to the network device.

* * * * *